United States Patent [19]
Murakami et al.

[11] Patent Number: 5,268,771
[45] Date of Patent: Dec. 7, 1993

[54] IMAGE RESTORATION PROCESSING SYSTEM AND METHOD

[75] Inventors: Tatsuya Murakami, Tachikawa; Eiichi Hadano, Kokubunji; Masaaki Fujinawa, Tokyo; Hiromichi Fujisawa, Tokorozawa; Kazunori Kinoshita, Odawara, all of Japan

[73] Assignee: Hitachi, Ltd., Chiyoda, Japan

[21] Appl. No.: 782,096

[22] Filed: Oct. 24, 1991

Related U.S. Application Data

[63] Continuation-in-part of Ser. No. 761,770, Aug. 15, 1991, which is a continuation-in-part of Ser. No. 479,615, Feb. 13, 1990, Pat. No. 5,128,748.

[30] Foreign Application Priority Data

Oct. 24, 1990 [JP] Japan ................. 2-284247

[51] Int. Cl.⁵ ............ H04N 1/40; H04N 1/46; G06K 9/36
[52] U.S. Cl. ............ 358/448; 358/455; 358/457; 358/458; 358/500; 382/54
[58] Field of Search ....... 358/448, 455, 456, 457, 358/458, 75, 80, 447; 382/42, 54

[56] References Cited

U.S. PATENT DOCUMENTS

| | | |
|---|---|---|
| 4,682,215 | 7/1987 | Adachi. |
| 4,750,044 | 6/1988 | Nakajima. |
| 4,945,496 | 7/1990 | Kurakake et al. ............ 382/54 |
| 5,125,045 | 6/1992 | Murakami et al. ............ 358/456 |
| 5,140,441 | 8/1992 | Sugiura et al. ............ 358/456 |

FOREIGN PATENT DOCUMENTS 0251278 1/1988 European Pat. Off..
092070 4/1987 Japan.

Primary Examiner—Edward L. Coles, Sr.
Assistant Examiner—Scott A. Rogers
Attorney, Agent, or Firm—Antonelli, Terry, Stout & Kraus

[57] ABSTRACT

An image processing system which has functions for inputting, storing or receiving, as a binary image data, an image as a document including a photograph having a varying brightness density and of outputting a multi-valued, half-tone image data to a display, a printer or the like, and an image processing method. The system includes a restoration processor. The restoration processor includes a storage for storing therein the binary image data scanningly inputted with use of a window of a predetermined size of m×n pixels, a white pixel number detector for detecting the number of white pixels in the binary image data within the window, a plurality of calculators for performing multiplication/accumulations operation over the binary image data within the window and a predetermined coefficient matrix to provide a plurality of multi-valued image data, and a selector for selecting one of the plurality of multi-valued image data found by the plurality of calculators.

41 Claims, 23 Drawing Sheets

FIG. 2A
PRIOR ART
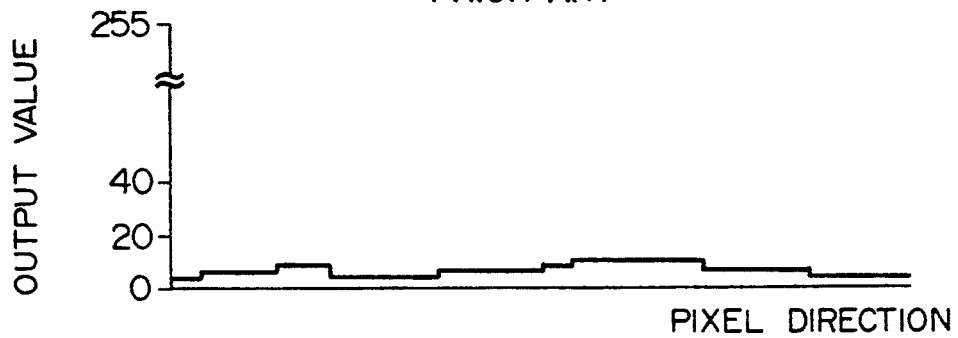
FIG. 2B
PRIOR ART
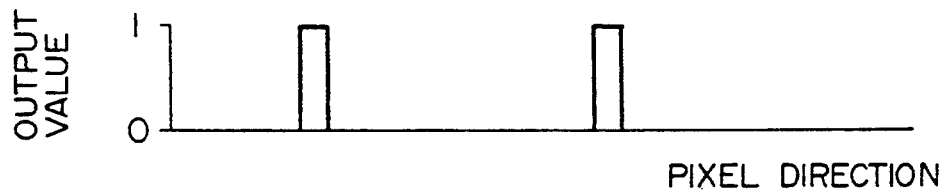
FIG. 2C
PRIOR ART
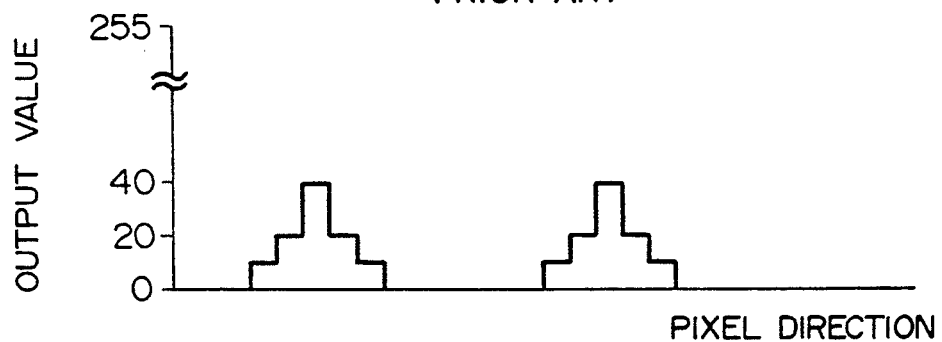
FIG. 2D
| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

FIG. 3A

| P11 | P12 | P13 | P14 | P15 | P16 |
|-----|-----|-----|-----|-----|-----|
| P21 | P22 | P23 | P24 | P25 | P26 |
| P31 | P32 | P33 | P34 | P35 | P36 |
| P41 | P42 | P43 | P44 | P45 | P46 |
| P51 | P52 | P53 | P54 | P55 | P56 |
| P61 | P62 | P63 | P64 | P65 | P66 |

FIG. 3B

| F11 | F12 | F13 | F14 | F15 | F16 |
|-----|-----|-----|-----|-----|-----|
| F21 | F22 | F23 | F24 | F25 | F26 |
| F31 | F32 | F33 | F34 | F35 | F36 |
| F41 | F42 | F43 | F44 | F45 | F46 |
| F51 | F52 | F53 | F54 | F55 | F56 |
| F61 | F62 | F63 | F64 | F65 | F66 |

FIG. 3C

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a43 | a44 | a45 |
| a51 | a52 | a53 | a54 | a55 |

FIG. 5

| F | E | D | E | F |
|---|---|---|---|---|
| E | C | B | C | E |
| D | B | A | B | D |
| E | C | B | C | E |
| F | E | D | E | F |

FIG. 7A

| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

FIG. 7B

| 2 | 2 | 2 | 2 | 2 |
|---|---|---|---|---|
| 2 | 8 | 8 | 8 | 2 |
| 2 | 8 | 8 | 8 | 2 |
| 2 | 8 | 8 | 8 | 2 |
| 2 | 2 | 2 | 2 | 2 |

FIG. 7C

| 4 | 4 | 4 | 4 | 4 |
|---|---|---|---|---|
| 4 | 4 | 4 | 4 | 4 |
| 4 | 4 | 4 | 4 | 4 |
| 4 | 4 | 4 | 4 | 4 |
| 4 | 4 | 4 | 4 | 4 |

FIG. 10

| | WHITE PIXEL NUMBER CNT | OUTPUT FLG |
|---|---|---|
| 1 | 0 | 3 |
| 2 | 1 | 3 |
| 3 | 2 | 2 |
| 4 | 3 | 2 |
| 5 | 4 | 1 |
| 6 | 5 | 1 |
| 7 | 6 | 1 |
| 8 | 7 | 1 |
| 9 | 8 | 1 |
| 10 | 9 | 1 |
| 11 | 10 | 1 |
| 12 | 11 | 1 |
| 13 | 12 | 1 |
| 14 | 13 | 1 |
| 15 | 14 | 1 |
| 16 | 15 | 1 |
| 17 | 16 | 1 |
| 18 | 17 | 1 |
| 19 | 18 | 1 |
| 20 | 19 | 1 |
| 21 | 20 | 1 |
| 22 | 21 | 1 |
| 23 | 22 | 2 |
| 24 | 23 | 2 |
| 25 | 24 | 3 |
| 26 | 25 | 3 |

F I G. 12

| DATA TO BE CALCULATED | COEFFICIENT TABLE (1) | COEFFICIENT TABLE (2) | COEFFICIENT TABLE (3) |
|---|---|---|---|
| CNT(A) | 16 | 8 | 4 |
| CNT(B) | 8 | 8 | 4 |
| CNT(C) | 4 | 8 | 4 |
| CNT(D) | 4 | 2 | 4 |
| CNT(E) | 2 | 2 | 4 |
| CNT(F) | 1 | 2 | 4 |

FIG. 16

|  | WHITE PIXEL NUMBER | | | OUTPUT |
|---|---|---|---|---|
|  | BCNT(CENT) | BCNT(MID) | BCNT(ALL) | FLG |
| 1 | — | — | 0 | 3 |
| 2 | — | — | 1 | 3 |
| 3 | — | 0 | 2 | 3 |
| 4 | 0 | 1 | 2 | 3 |
| 5 | 1 | 1 | 2 | 2 |
| 6 | — | 2 | 2 | 2 |
| 7 | — | — | 3 | 2 |
| 8 | — | — | 4 | 1 |
| 9 | — | — | 5 | 1 |
| 10 | — | — | 6 | 1 |
| 11 | — | — | 7 | 1 |
| 12 | — | — | 8 | 1 |
| 13 | — | — | 9 | 1 |
| 14 | — | — | 10 | 1 |
| 15 | — | — | 11 | 1 |
| 16 | — | — | 12 | 1 |
| 17 | — | — | 13 | 1 |
| 18 | — | — | 14 | 1 |
| 19 | — | — | 15 | 1 |
| 20 | — | — | 16 | 1 |
| 21 | — | — | 17 | 1 |
| 22 | — | — | 18 | 1 |
| 23 | — | — | 19 | 1 |
| 24 | — | — | 20 | 1 |
| 25 | — | — | 21 | 1 |
| 26 | — | — | 22 | 2 |
| 27 | 0 | 7 | 23 | 2 |
| 28 | 1 | 7 | 23 | 3 |
| 29 | — | 8 | 23 | 3 |
| 30 | — | 9 | 23 | 3 |
| 31 | — | — | 24 | 3 |
| 32 | — | — | 25 | 3 |

FIG. 20

| | INPUT | | | OUTPUT | | |
|---|---|---|---|---|---|---|
| | FLGr | FLGg | FLGb | FLGXr | FLGXg | FLGXb |
| 1 | 1 | 1 | 1 | 1 | 1 | 1 |
| 2 | 1 | 1 | 2 | 1 | 1 | 2 |
| 3 | 1 | 1 | 3 | 1 | 1 | 3 |
| 4 | 1 | 2 | 1 | 1 | 2 | 1 |
| 5 | 1 | 2 | 2 | 1 | 2 | 2 |
| 6 | 1 | 2 | 3 | 1 | 3 | 3 |
| 7 | 1 | 3 | 1 | 1 | 3 | 1 |
| 8 | 1 | 3 | 2 | 1 | 3 | 3 |
| 9 | 1 | 3 | 3 | 2 | 3 | 3 |
| 10 | 2 | 1 | 1 | 2 | 1 | 1 |
| 11 | 2 | 1 | 2 | 2 | 1 | 2 |
| 12 | 2 | 1 | 3 | 3 | 1 | 3 |
| 13 | 2 | 2 | 1 | 2 | 2 | 1 |
| 14 | 2 | 2 | 2 | 2 | 2 | 2 |
| 15 | 2 | 2 | 3 | 3 | 3 | 3 |
| 16 | 2 | 3 | 1 | 3 | 3 | 1 |
| 17 | 2 | 3 | 2 | 3 | 3 | 3 |
| 18 | 2 | 3 | 3 | 3 | 3 | 3 |
| 19 | 3 | 1 | 1 | 3 | 1 | 1 |
| 20 | 3 | 1 | 2 | 3 | 1 | 3 |
| 21 | 3 | 1 | 3 | 3 | 2 | 3 |
| 22 | 3 | 2 | 1 | 3 | 3 | 1 |
| 23 | 3 | 2 | 2 | 3 | 3 | 2 |
| 24 | 3 | 2 | 3 | 3 | 3 | 3 |
| 25 | 3 | 3 | 1 | 3 | 3 | 2 |
| 26 | 3 | 3 | 2 | 3 | 3 | 3 |
| 27 | 3 | 3 | 3 | 3 | 3 | 3 |

FIG. 23

| | INPUT | | | | | OUTPUT | | |
|---|---|---|---|---|---|---|---|---|
| | FLG-P | FLG-d | FLGr | FLGg | FLGb | FLGXr | FLGXg | FLGXb |
| 1 | 0 | — | 1 | 1 | 1 | 1 | 1 | 1 |
| 2 | 0 | — | 1 | 1 | 2 | 1 | 1 | 2 |
| 3 | 0 | — | 1 | 2 | 1 | 1 | 2 | 1 |
| 4 | 0 | — | 1 | 2 | 2 | 2 | 2 | 2 |
| 5 | 0 | — | 2 | 1 | 1 | 2 | 1 | 1 |
| 6 | 0 | — | 2 | 1 | 2 | 2 | 2 | 2 |
| 7 | 0 | — | 2 | 2 | 1 | 2 | 2 | 2 |
| 8 | 0 | — | 2 | 2 | 2 | 2 | 2 | 2 |
| 9 | 1 | 1 | 1 | 1 | 1 | 1 | 1 | 1 |
| 10 | 1 | 1 | 1 | 1 | 2 | 1 | 1 | 2 |
| 11 | 1 | 1 | 1 | 2 | 1 | 1 | 2 | 1 |
| 12 | 1 | 1 | 1 | 2 | 2 | 2 | 2 | 2 |
| 13 | 1 | 1 | 2 | 1 | 1 | 2 | 1 | 1 |
| 14 | 1 | 1 | 2 | 1 | 2 | 2 | 2 | 2 |
| 15 | 1 | 1 | 2 | 2 | 1 | 2 | 2 | 2 |
| 16 | 1 | 1 | 2 | 2 | 2 | 2 | 2 | 2 |
| 17 | 1 | 0 | — | — | — | 3 | 3 | 3 |

F I G. 24A
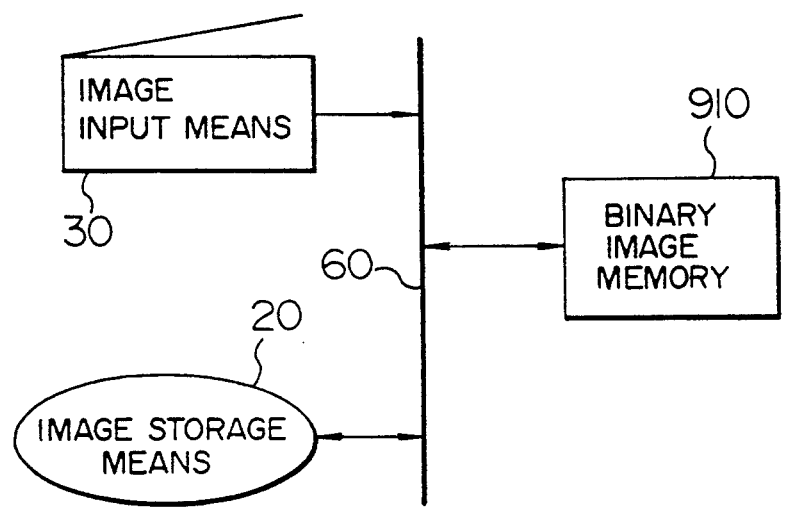
F I G. 24B
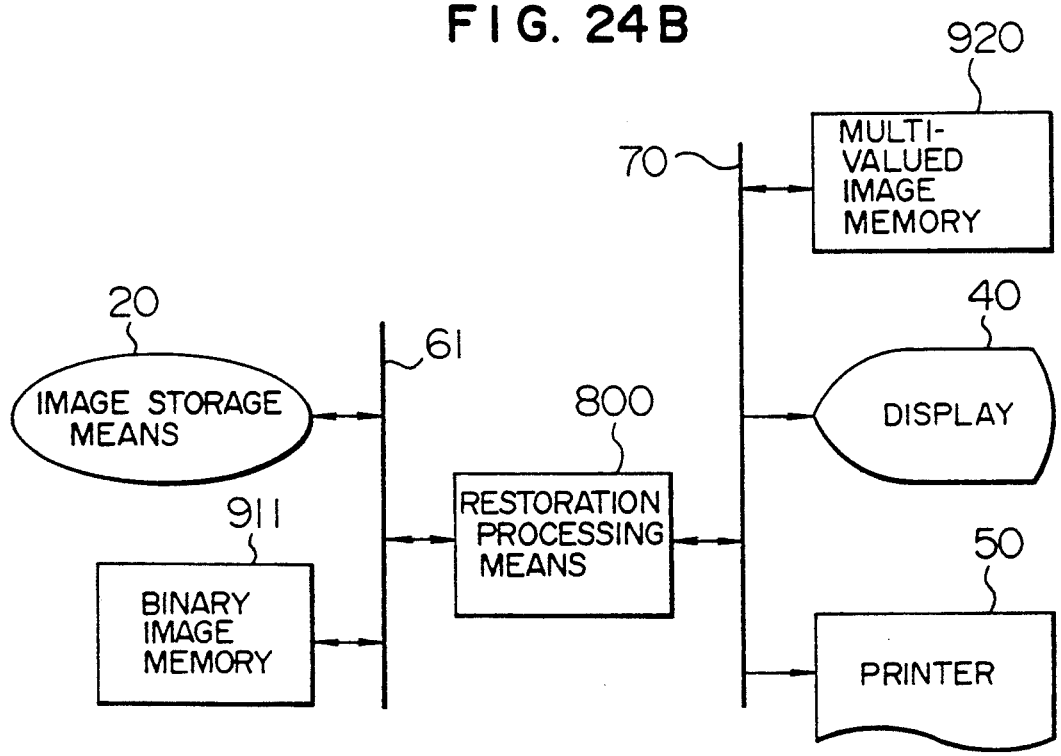

IMAGE RESTORATION PROCESSING SYSTEM AND METHOD

CROSS REFERENCES TO RELATED APPLICATIONS

This application is a continuation-in-part of U.S. application Ser. No. 07/761,770, filed Aug. 15, 1991 (PCT JP 90/01630, filed Dec. 13, 1990), which is a continuation-in-part application of U.S. Ser. No. 07/479,615 filed Feb. 13, 1990, now U.S. Pat. No. 5,128,748 the disclosure of which is hereby incorporated by reference.

BACKGROUND OF THE INVENTION

The present invention relates to an image processing system which has a function of inputting, storing or receiving, as a binary data, an image, in particular, an image such as a document including a photograph having a varying brightness density and of outputting a multi-valued, half-tone image to a display, a printer or the like.

In apparatuses such as facsimile machines and electronic filing systems for handling document data as image data, in general, an image is processed as binary data having white and black values. In this case, such an image having a varying brightness density as a photograph is subjected to a half-tone dot screening operation called "dither". There have been already widely known many dither methods which include, for example, an organization dither method and a mean error least method (e.g., refer to a paper Japanese article of Journal of The Institute of Image Electronics Engineers of Japan, Vol. 10, No. 5, pp. 388-397).

However, the dither image is remarkable in the shape of the half-tone dot screening at the time of its output. To avoid this, there have been studied several systems wherein the multi-valued image data is again subjected to a conversion at the time of its output to output a multi-valued half-tone image. One of its detailed systems have been suggested, for example, in a Japanese periodical "Technique Of Restoring Binary Image Into Half-Tone Image", Image Labo., March 1990, pp. 19-24.

However, in these systems, since dither images converted into binary forms by an organization dither method are handled, no consideration is paid to the application of these systems to such random dither images which have been recently increasingly utilized based on a mean error least method or the like.

Meanwhile, U.S. patent application Ser. No. 07/272,447 filed Nov. 17, 1988 (JP-A-2-90377) discloses a system in which a half-tone image is reproduced from a binary image independently of a dither method. However, since this system is intended to convert the reproduced image to a binary form again and then output the image, no consideration is paid to the quality of the reproduced image itself in this system.

When it is desired to reproduce a half-tone image from a dither image including a random dither image, the prior art systems have had problems which follow.

The processing of reproducing a multi-valued half-tone image from a binary dither image is a sort of filtering processing with use of a low pass filter. A system for counting the number of white pixels in a certain region and using the white pixel number counted as a brightness or luminance means that the filter is completely flat in its certain frequency range, which results in that a reproduced image is removed in its high frequency components and thus a resultant image display is blurred.

In a random dither image, the distribution density of black pixels macroscopically coincides with the average luminance of the region but its local distribution density varies from region to region.

Since many of systems based on the organization dither method assume that white and black pixel appearance frequency is periodical or cyclical, the random dither method is unsuitable for these systems.

The above-mentioned U.S. application Ser. No. 07/272,447 teaches a system in which brightness is calculated through the convolution operation of a dither image within a window and a Gaussian function with use of a filter having specific spatial frequency characteristics. In this system, however, it is difficult to determine a suitable filter coefficient. Further, no consideration is paid, at all, in this system to the case where a color image is handled. Furthermore, white and black pixels are present as isolated points in regions having very low and high brightness. For example, in the case where an original half-tone image has 256 stages of tones, only one of 256 pixels is a white pixel even on average in a region having a brightness of 1/256. When such an image is scanned with a very small reference window, all the pixels within the window are black pixels in most case, and one or more white pixels are present in the window in very few cases. When such an image is reproduced with a single filter, brightness is concentrated rated on a particular part of the region.

FIG. 2 shows an example. More specifically, when such a low brightness region as shown in FIG. 2A is subjected to a dither processing, white pixels are less generated as shown in FIG. 2B. When the dither image is subjected to a half-tone image reproducing operation with use of a filter as shown in FIG. 2D, an output image takes such values as shown in FIG. 2C. The output image has substantially the same average brightness as the region of FIG. 2A but the values of pixels of the output image are concentrated on certain pixels. Thus, this results in generation of drop-like noise in the image and thus deterioration of its image quality.

SUMMARY OF THE INVENTION

In order to solve the above problems in the prior art, it is an object of the present invention to compute a multi-valued image data through the convolution operation of a dither image with use of a filter having predetermined spatial frequency characteristics.

To this end, in the present invention, there are provided means for inputting a binary image data subjected to a dither processing through the scanning operation of the data with a window of a predetermined size of m x n pixels and for storing the binary image data as well as calculation means for performing a multiplication/accumulation operation over the binary image data within the window and a predetermined coefficient matrix. The calculation means suppresses the peak of drop-like noise generated in the reproduced image with use of a low pass filter with respect to a region having white and black isolated points. That is, the calculation means is a convolution means for performing a convoluting operation over a plurality of filters having different frequency bands and the dither image.

Further provided in the present invention are for detecting the number of white pixels in the binary image subjected to the dither processing within the window or a white pixel distribution pattern thereof as a feature and means for selecting one of the plurality of filters to select and output one of a plurality of half-tone outputs, calculated using the plurality of filters.

Explanation will be made of the operations of respective parts of the aforementioned problem solving means. Human beings can recognize high and low brightness in an image through a dither image which are subportions of a screen pattern formed of black and white elements. This is because viewer's eyes act as a sort of low pass filter. Accordingly, in order to calculate a half-tone image suitable for human sight from the dither image, the similar system to this may be considered. More specifically, a multi-valued image data is calculated on an every pixel basis by performing a multiplication/accumulation operation over a close dither image with use of a filter having person's visual characteristics.

When black/white pixel generation frequency is remarkably biased, drop-like noise generation points can be suppressed by switching the coefficients of the filters according to the black/white distribution pattern. The coefficient switching can be carried out for effective selection with use of a simple and convenient arrangement based on the number of white pixels in the reference window at the time of reproducing a half-tone image.

Meanwhile, when it is desired to handle a color image, the color image can be expressed in terms of a combination of three colors R, G and B. Accordingly, a dither image is also expressed by three planes of R, G and B color dither images. When it is desired to restore a half-tone image, a problem that drop-like noise takes place for an image having high saturation can be solved not by determining coefficients for the different colors independently of each other but by referencing the pixel distribution patterns of the three planes of dither images at the same time and determining the coefficients and mutual correlation therebetween.

In the case of such an image expressed originally with black and white binary image as a text image, the white and black in the binary image are expressed as the multivalued data that they are. In this case, reference of only white or black in its center pixel enables the image to be clearly displayed without any blurred portions. Therefore, the present invention can be applied even to an image having a letter symbol and a figure mixed together. In this case, an identifier between the dither image and line/figure is used as a feature to execute the coefficient switching. The identifier may be externally input together with the image data at the same time or may be replaced by a result of a binary image subjected to an identification processing at the time of its input.

BRIEF DESCRIPTION OF THE DRAWINGS

FIGS. 2A-2D show diagrams for explaining the causes of generation of drop-like noise which has been a problem in the prior art;

FIGS. 3A-3C show diagrams for explaining a restoring operation method which forms one of features of the present invention and for explaining symbols for input/output data;

FIG. 5 is a diagram for explaining a block of binary data;

FIGS. 7A-7C show an example of a group of coefficient matrixes;

FIG. 10 is a diagram for explaining an exemplary operation of a restoration coefficient selector;

FIG. 12 is a diagram for explaining an internal structure of a coefficient matrix file;

FIG. 16 is a diagram for explaining the operation of a coefficient selector when the white pixel distribution is used as the feature;

FIG. 20 is a diagram for explaining the operation of a restoration coefficient selector when the color image is handled;

FIG. 23 is a diagram for explaining the operation of a restoration coefficient selector in FIG. 22; and FIGS. 24A-24B show diagrams for explaining how to store image data using a restoration processing means.

DESCRIPTION OF THE PREFERRED EMBODIMENTS

Figure 1:
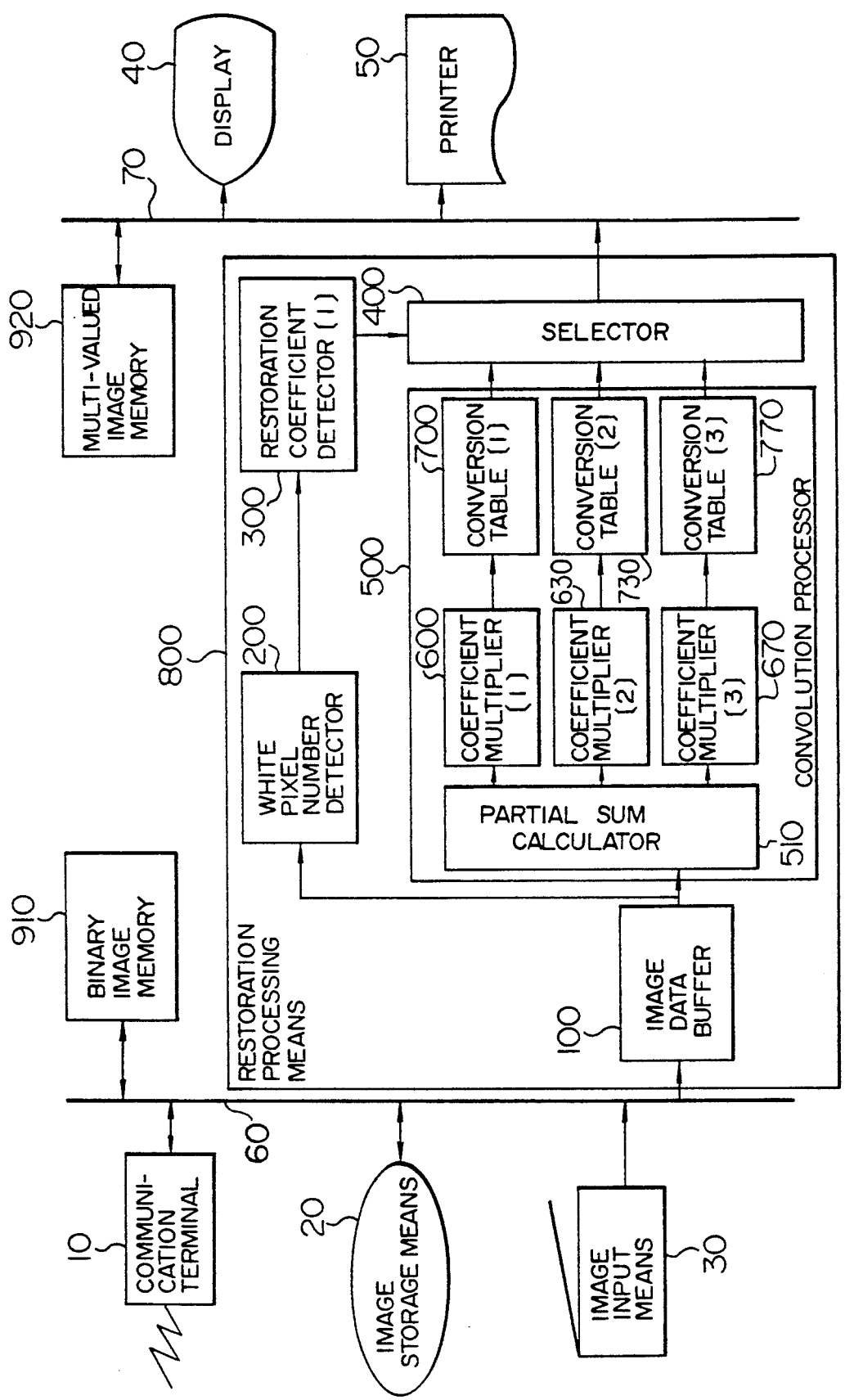
FIG. 1 is a diagram for explaining a basic arrangement of a first embodiment of the present invention.

Embodiments of the present invention will be detailed with reference to the accompanying drawings. Referring first to FIG. 1, there is shown a functional block diagram of an arrangement of a first embodiment of the present invention, which includes input means 10, 20 and 30 for inputting binary image data in a known manner therethrough, output means 40 and 50 for displaying and printing a multi-valued image output data respectively, an input bus 60, an output bus 70, a binary image memory 910, a multi-valued image memory 920, and a restoring means 800 which forms one of the features of the present invention. The term "restoring", used herein, indicates the conversion of a binary image data into a gray-level image data. More specifically, the input means 10 corresponds to a communication terminal such as a facsimile machine, the input means 20 corresponds to an image storage means such as a filing device, and the input means 30 corresponds to an image input means such as an image scanner. The output means 40 corresponds, for example, to a display means such as a CRT while the output means 50 corresponds, for example, to a printer.

Explanation will be made first of a general processing flow and then as to the detailed structures and operations of the respective parts of the first embodiment.

First of all, a binary image data obtained from at least one of the input means 10, 20 and 30 is once stored into the binary image memory 910 and input bus 60. The binary image memory 910 has a function of accommodating a difference in timing between the processing of the present invention and the data input through the input bus 60. Accordingly, when the synchronization of operational timing between the both is realized, the image data can be processed while being input. The binary image data stored in the binary image memory 910 is sequentially transferred to an image data buffer 100 in the restoring means 800 on a scanning line basis.

In this case, the above data transfer may be replaced by, for example, transferring a plurality of picture elements (pixels) at the same time with use of a parallel-serial converter or the like.

The image data buffer 100 partially stores therein the image data being received on every pixel basis and sequentially outputs, to a convolution processor 500, data in a range necessary for the convolution.

Explanation will next be made of data to be used for image restoration. FIG. 3A shows an input binary image and FIG. 3B shows an output multi-valued image. In the drawings, a variable P(i,j) represents a binary data having coordinates (i,j) and F(i,j) represents the value of multi-valued data.

When it is desired to find a multi-valued data F(x,y) having coordinates (x,y), coordinates (m,n) for a binary data to be used for the convolution satisfy the following relationship (1), assuming the convolution range.

$$x-2 \leq m \leq x+2$$
$$y-2 \leq n \leq y+2 \quad (1)$$

The multi-valued data F(x,y) can be obtained with use of the obtained binary data P(m,n) corresponding to 25 pixels and through the multiplication/accumulation operation of a coefficient matrix as shown in FIG. 3C. An example of the multiplication/accumulation operation is shown by the following equation (2).

$$F(X,Y) \begin{vmatrix} P_{(x-2,y-2)} & \cdots & P_{(x+2,y-2)} \\ \cdot & & \cdot \\ \cdot & & \cdot \\ \cdot & & \cdot \\ P_{(x-2,y-2)} & \cdots & P_{(x+2,y-2)} \end{vmatrix} \times \quad (2)$$

-continued $$\begin{vmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{vmatrix}$$

It is the image data buffer 100 in FIG. 1 that sequentially supplies such data of 25 pixels. Each time one-pixel data is supplied to the image data buffer 100, the image data buffer 100 outputs 25-pixel data to the convolution processor 500 and a white pixel number detector 200. The white pixel number detector 200 counts the number of white pixels in the received binary image data corresponding to the 25 pixels.

In the present embodiment "white" and "black" are described in terms of "1" and "0" in the binary image data, respectively. In this case, the number of white pixels is easily obtained by adding together the received binary data corresponding to 25 pixels. The number of white pixels as an output of the white pixel number detector 200 is transferred to a restoring coefficient selector [1] 300.

The restoration coefficient selector [1] 300 selects one of three sorts of restoration coefficients as illustrated and sends a control signal FLG to a selector 400 to output only an operational result based on the selected restoration coefficient Meanwhile, the convolution processor 500 performs a multiplication/accumulation operation over the received 25-pixel binary data with use of the three given sorts of coefficient matrixes. The three sorts of coefficient matrixes are operated independently to obtain independent outputs. The details of the coefficients will be explained later. Multi-valued data obtained as a result of the multiplication/accumulation operation are output through respective conversion tables 700, 730 and 770 to the selector 400, respectively. Each of the conversion tables is used to accommodate a difference between the multiplication/accumulation operation output and the output range of the entire system and, when no difference is found between the two, the conversion table may be removed.

The selector 400 finally selects one of the three sorts of multi-valued data received from the conversion tables 700, 730 and 770 and sends it, via the output bus 70, to an output means, such as the display 40 or the printer 50, or to a multi-valued image memory 920.

The multi-valued image memory 920 has functions for synchronizing the restoration processing means 800 and the different sorts of output means and also for storing therein the multi-valued image data as the operational results.

Further, a data storage having a large capacity such as, for example, an optical disk may be connected to the output bus 70 to store the output of the restoration processing means 800.

Detailed explanation will next be made of the structures and operations of the respective parts of the adaptive restoration processing means 800.

Figure 4:
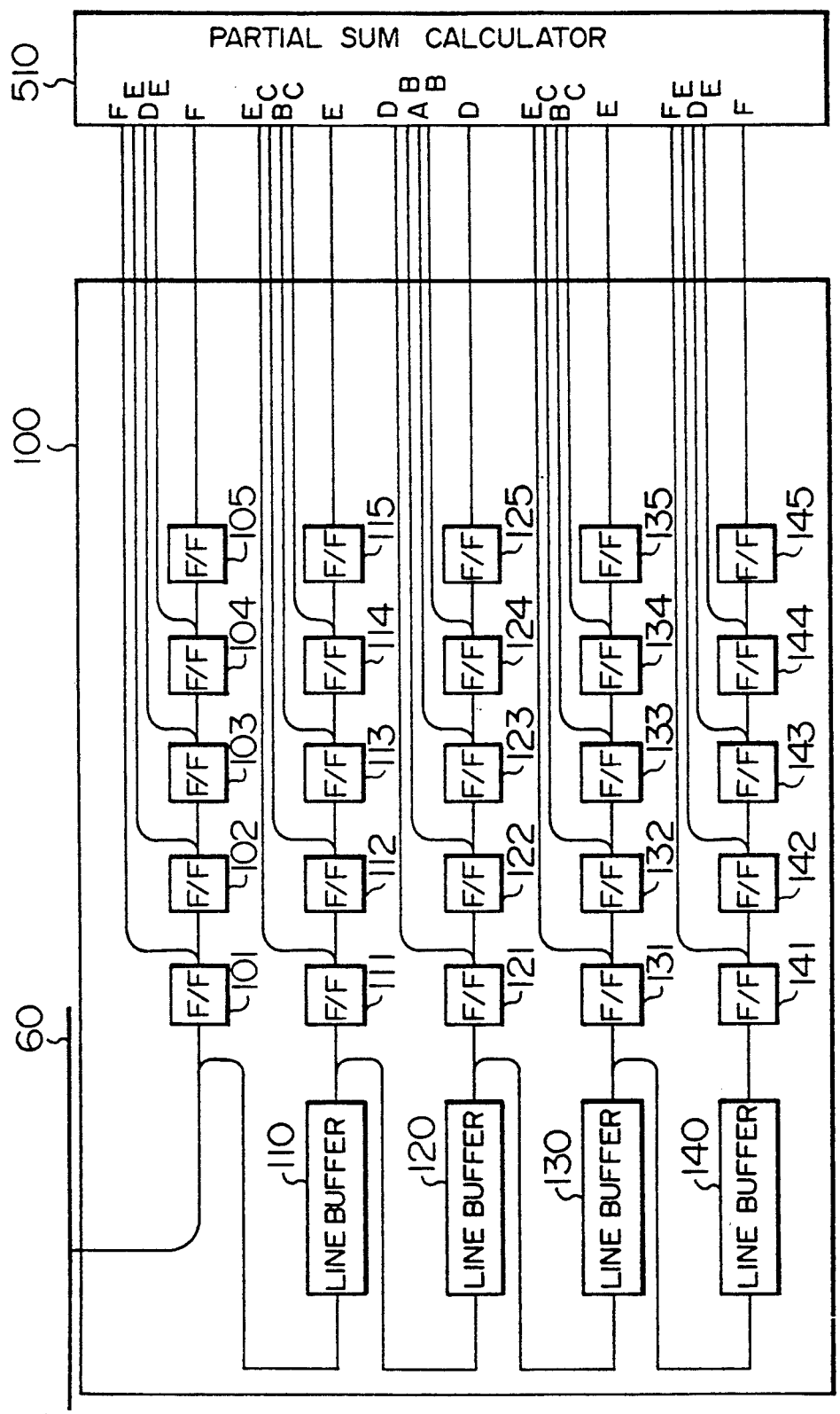
FIG. 4 is an exemplary arrangement of an image data buffer.

Shown in FIG. 4 is an example of the structure of the image data buffer 100 which includes line buffers 110, 120, 130 and 140 for storing therein, respectively, image data corresponding to one scanning line and latch mechanisms 101 to 105 and 111 to 115 such as flip-flops for temporarily storing therein respectively one-pixel data. Each of the latch mechanisms may include more than 5 stages of shift registers.

Assume now that a binary image data P(x+3,y+2) having coordinates (x+3,y+2) is applied to the image data buffer 100 from the input bus 60. Then the latches 101 to 105 hold therein and output P(x+2,y+2), P(x+1,y+2), P(x,y+2), P(x−1,y+2) and P(x−2,y+2), respectively. Meanwhile, the four line buffers 110, 120, 130 and 140 store therein, respectively, a data corresponding to one scanning line. Thus, at this time, the line buffers output P(x+3,y+1), P(x+3,y), P(x+3,y−1) and P(x+3,y−2), respectively. The latches connected to the respective line buffers sequentially hold and output one-pixel data to the next latches, as in the latches 101 to 105.

As a result, the image data buffer, when receiving the data P(x+3,y+2), outputs 25-pixel data P(m,n), where x−2≦m≦x+2 and y−2≦n≦y+2.

In the drawing, 25 signal lines are classified into 6 groups which correspond in number to the inputs of a partial sum calculator 510 in the convolution processing means 500.

With respect to the coefficients to be multiplied in the convolution operation, when such a restriction that an identical coefficient is used for pixels an equal distance from a center are placed on the coefficients, an identical coefficient is used for each of such pixels B, C, D, E and F as shown in FIG. 5. Therefore, pixels can be combined into groups and then counted. To this end, for example, the four pixels denoted by B in FIG. 5 are determined to have a coefficient B. The same explanation holds true for the pixels C, D, E and F. Since the pixel A as the center of an image to be restored may be determined to have an independent coefficient, the pixel A is independently transferred.

Figure 6:
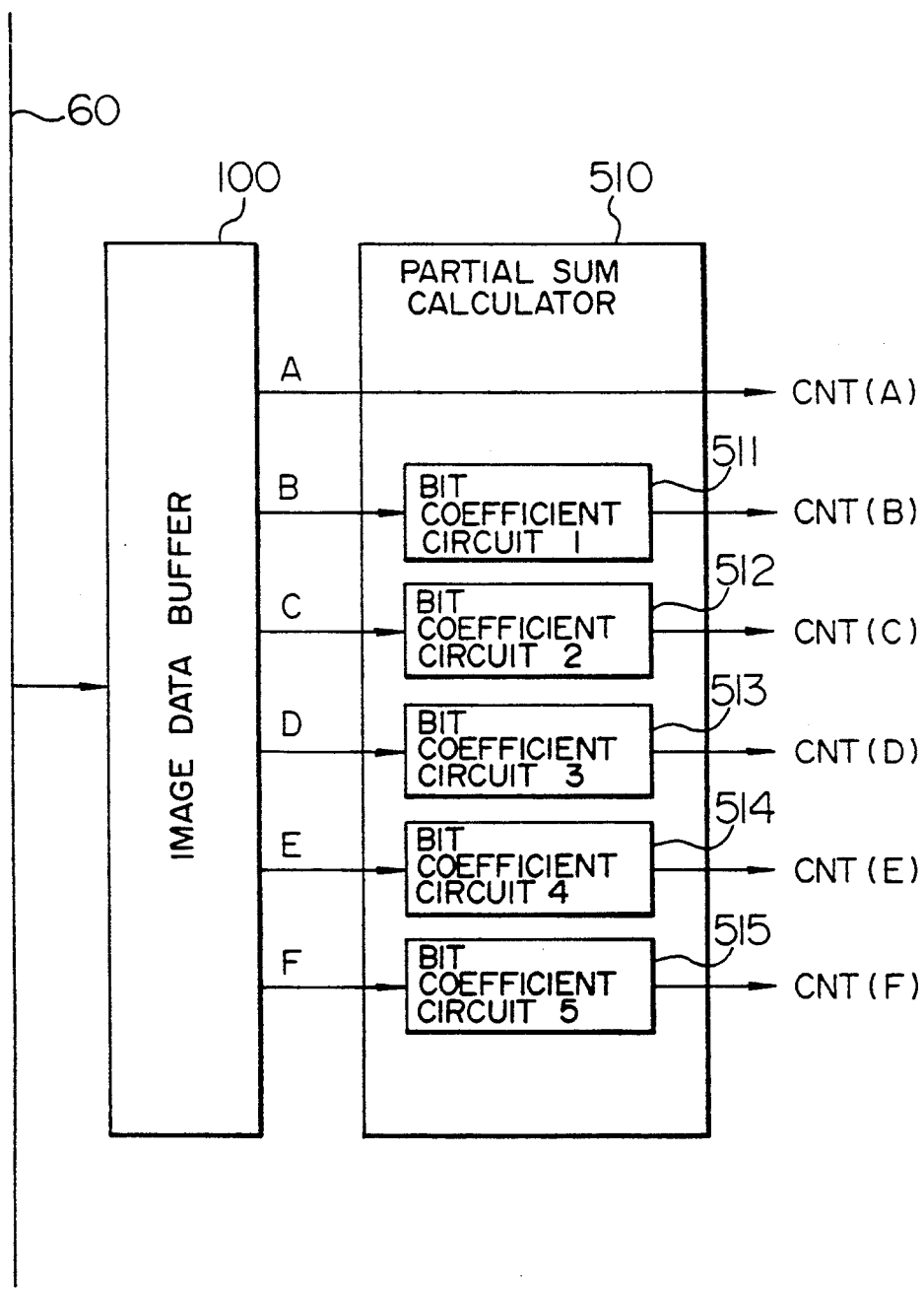
FIG. 6 is an example of an internal structure of a partial sum calculator.

Explanation will then be made of the internal structure of the convolution processor 500. When the convolution processor 500 receives the binary image data, the partial sum calculator 510 calculates the sums of white pixels in blocks A to F. FIG. 6 shows an exemplary structure of the partial sum calculator 510. In the drawing, 5 bit-counter circuits 511 to 515 detect the numbers of white pixels in the respective blocks of the binary image data and output them as output data CNT(B) to CNT(F), respectively. The 6 sorts of output data CNT(A) to CNT(F) of the partial sum calculator 510 are then applied to three coefficient multipliers 600, 630 and 670, respectively. These multipliers multiply their input data by their predetermined coefficients. In the present embodiment, explanation will be made of the case where such three sorts of coefficients as shown in FIG. 7 are used as the coefficients of the multiplication-/accumulation operation. FIG. 7 shows examples in which the three sorts of data have different coefficient gradients in the vicinity of a target pixel. More specifically, FIG. 7A is an example where the gradient is most abrupt and FIG. 7C is an example where the gradient is completely flat.

Explanation will be made of the case where the data of FIGS. 7A, 7B and 7C are used for the coefficient multipliers 600, 630 and 670, respectively. When the coefficient multiplexer [1] 600 receives the data of FIG. 7A, the multiplier 600 generates an output G1(x,y) which is obtained in accordance with the following equation.

$$G1(x,y) = CNT(A) \times 16 + CNT(B) \times 8 + CNT(C) \times 4 + CNT(D) \times 4 + CNT(E) \times 2 + CNT(F) \times 1$$

Figure 8:
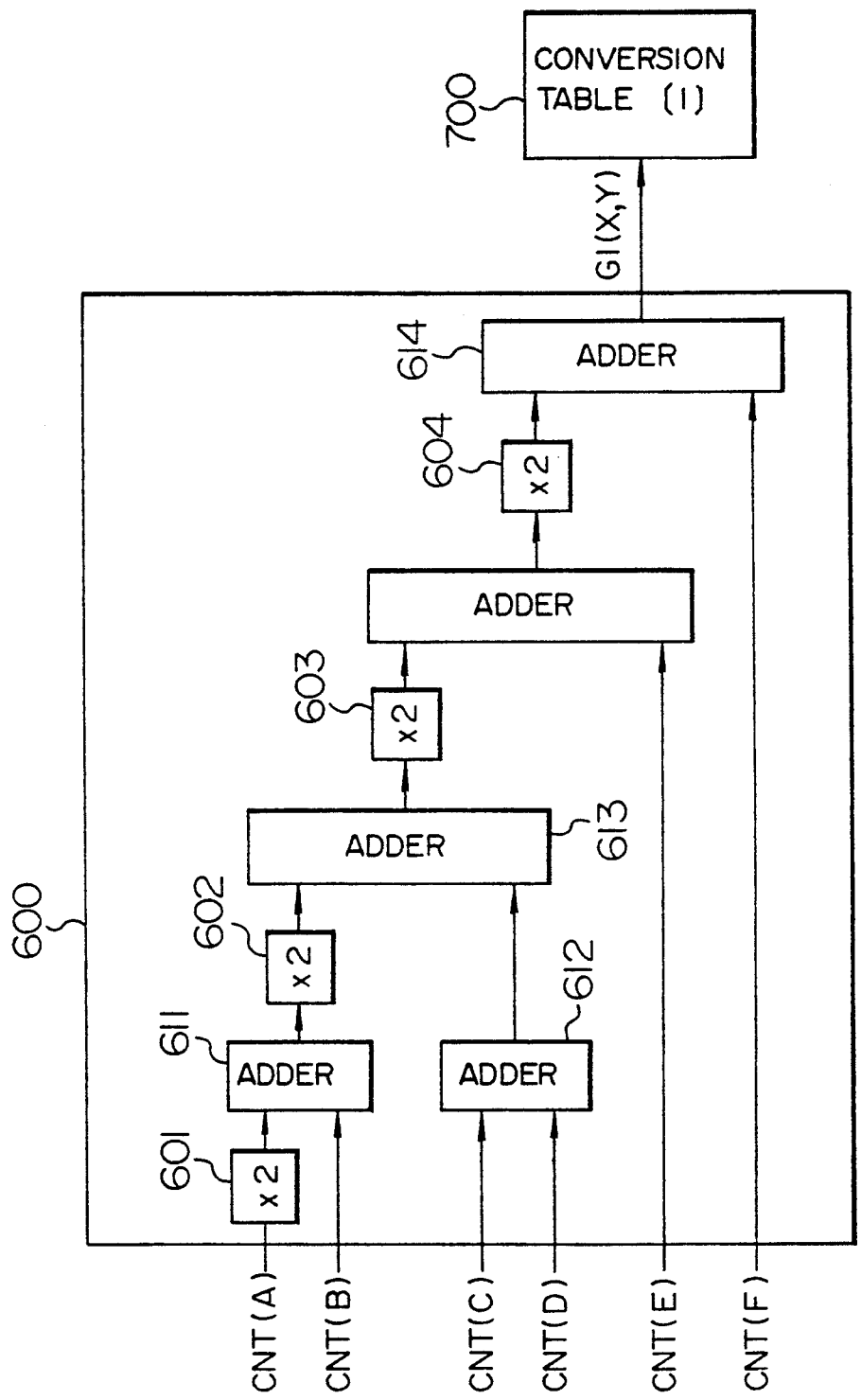
FIG. 8 is an example of an internal structure of a coefficient multiplier.

An example of the internal structure of the coefficient is shown in FIG. 8, which includes shift registers 601 to 604 for doubling their input values and adders 611 to 615 for adding together their two sorts of multi-valued input data. As a result, the coefficient multiplier [1] 600 outputs the multi-valued multiplication/accumulation operation result G1(x,y).

The same holds true for the coefficient data of FIG. 7B. In this case, the coefficient multiplier [2] 630 generates an output value G2(x,y) which is obtained in accordance with the following equation.

$$G2(x,y) = CNT(A) \times 8 + CNT(B) \times 8 + CNT(C) \times 8 + (CNT(D) \times 4 + CNT(E) \times 4 + CNT(F) \times 4$$

Figure 9:
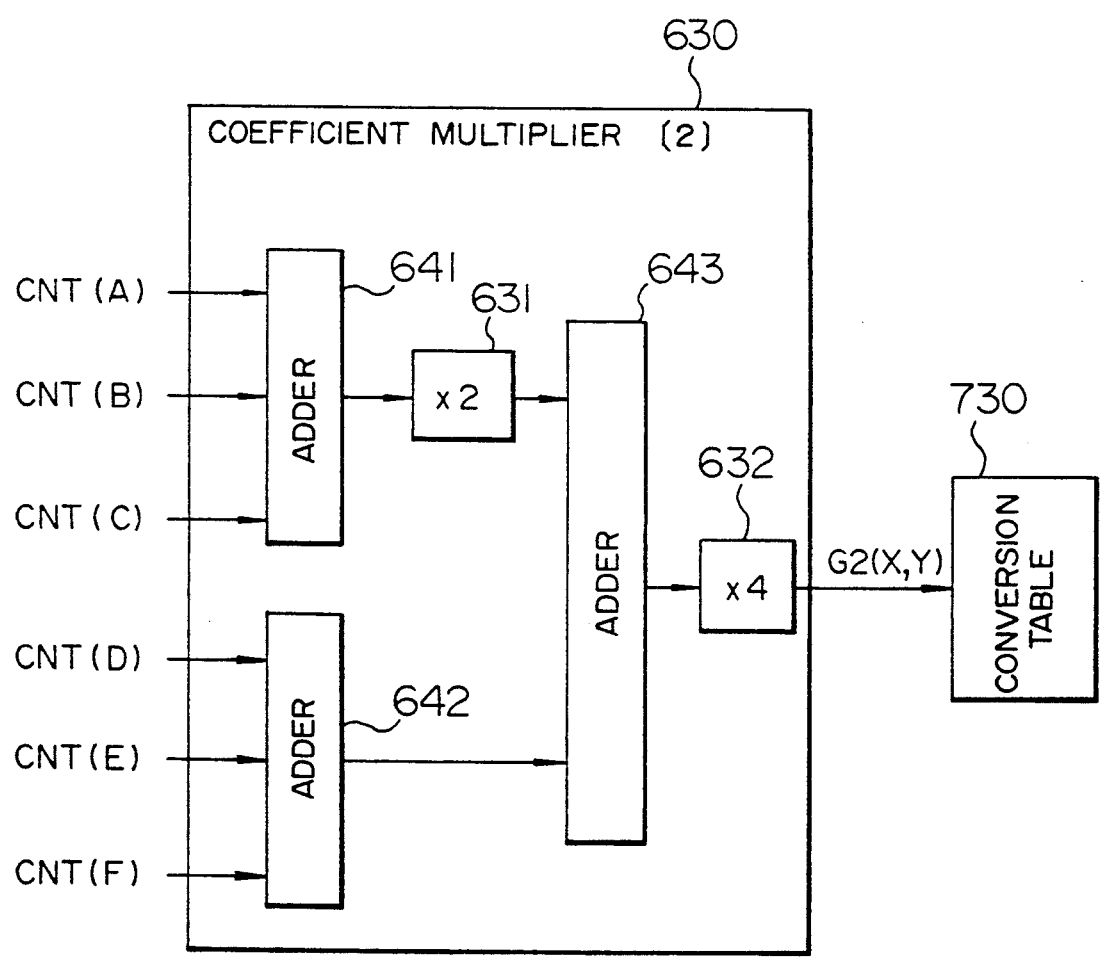
FIG. 9 is an example of an internal structure of another coefficient multiplier.

Shown in FIG. 9 is an example of the internal structure of the coefficient multiplier [2] 630 for the execution of the above equation. In the drawing, shift registers 631 and 632 mutliply their input data by 2 and 4 respectively while adders 641 to 643 add together their two sorts of multi-valued input data. As a result, the coefficient multiplier [2] 630 outputs the G2(x,y).

Similarly, in the case of the coefficient of FIG. 7C, the number of white pixels is counted and then multiplied by 4. How to realize this will be obvious from the above explanation.

The three sorts of multi-valued data G1(x,y), G2(x,y) and G3(x,y) obtained as a result of the restoration are sent to the respective conversion tables 700, 730 and 770. These conversion tables are used to convert their received multi-valued data G(x,y) into multi-valued data F(x,y) in accordance with their predetermined equations.

The contents of the conversion include the adjustment of an acceptable data range and the correction of characteristics of output means 40 and 50. With respect to the acceptable data range, when the coefficients in the present embodiment are employed for example, the output range of the coefficient multiplier [1] 600 is from 0 to 100. When the present system handles 8-bit multi-valued data, the maximum of the range must be 255. In order to accommodate or adjust the difference, the data is multiplied by a proper constant at the conversion table [1] 700. Meanwhile, the correction of the characteristics of the output means includes many known systems such as γ conversion.

Next, detailed explanation will be made as to how to finally select the output F(x,y) on the basis of the three sorts of multi-valued data F1, F2 and F3 through the white pixel number detector 200, restoration coefficient selector [1] 300 and selector 400. The selection is determined based on the distribution density of white pixels. The handling of isolated points, which has been a problem at the time of restoring a dither image in the prior art, can be improved by utilizing a flat coefficient causing less fluctuation of the restored value when the distribution density of white or black pixels is remarkably low. To this end, in the present embodiment, the number of white pixels in 5×5 pixels is detected for reference at the restoration as mentioned above. The white pixel number detector 200 can be realized by finding a sum of the 6 sorts of multi-valued data CNT(A) to CNT(F). The sum of the 5 sorts of multi-valued data can be realized by means of a combination of known adders.

Assume now that the white pixel number detector 200 generates an output CNT(x,y) when restoration is carried out with respect to coordinates (x,y). Then the restoration coefficient selector [1] 300 determines and outputs a selector drive signal FLG(x,y) on the basis of the data CNT(x,y). An exemplary operation of the restoration coefficient selector [1] 300 is shown in FIG. 10. In this case, the FLG is determined by a ratio between white and black pixel numbers. The restoration coefficient selector [1] 300 may be realized, in actual applications, by a read only memory (ROM). The selector 400, when receiving the output FLG(x,y) of the restoration coefficient selector [1] 300, selects one of the three sorts of multi-valued data F1(x,y), F2(x,y) and F3(x,y) and outputs the selected multi-valued data onto the signal line 70 as the F(x,y).

Although explanation has been made of the use of such 3 sorts of coefficients as shown in FIG. 7 in the present embodiment, other suitable coefficients may be similarly employed to realize the similar effects. Further, the size of the coefficient has been 5×5 pixels in the present embodiment, but another suitable size may be employed by changing the configuration of the image data buffer 100. Also, by using '0' in part of the restoration coefficient matrix, substantially the same effects as when the size of the coefficient matrix is varied according to conditions can be obtained.

Switching of the operational result according to the image conditions may also be realized by, in addition to the provision of the plurality of coefficient multipliers 600, 630 and 670 as mentioned above, storing a plurality of coefficient matrixes, and selecting one of the matrixes according to the conditions to use it in the multiplication/accumulation operation.

Figure 11:
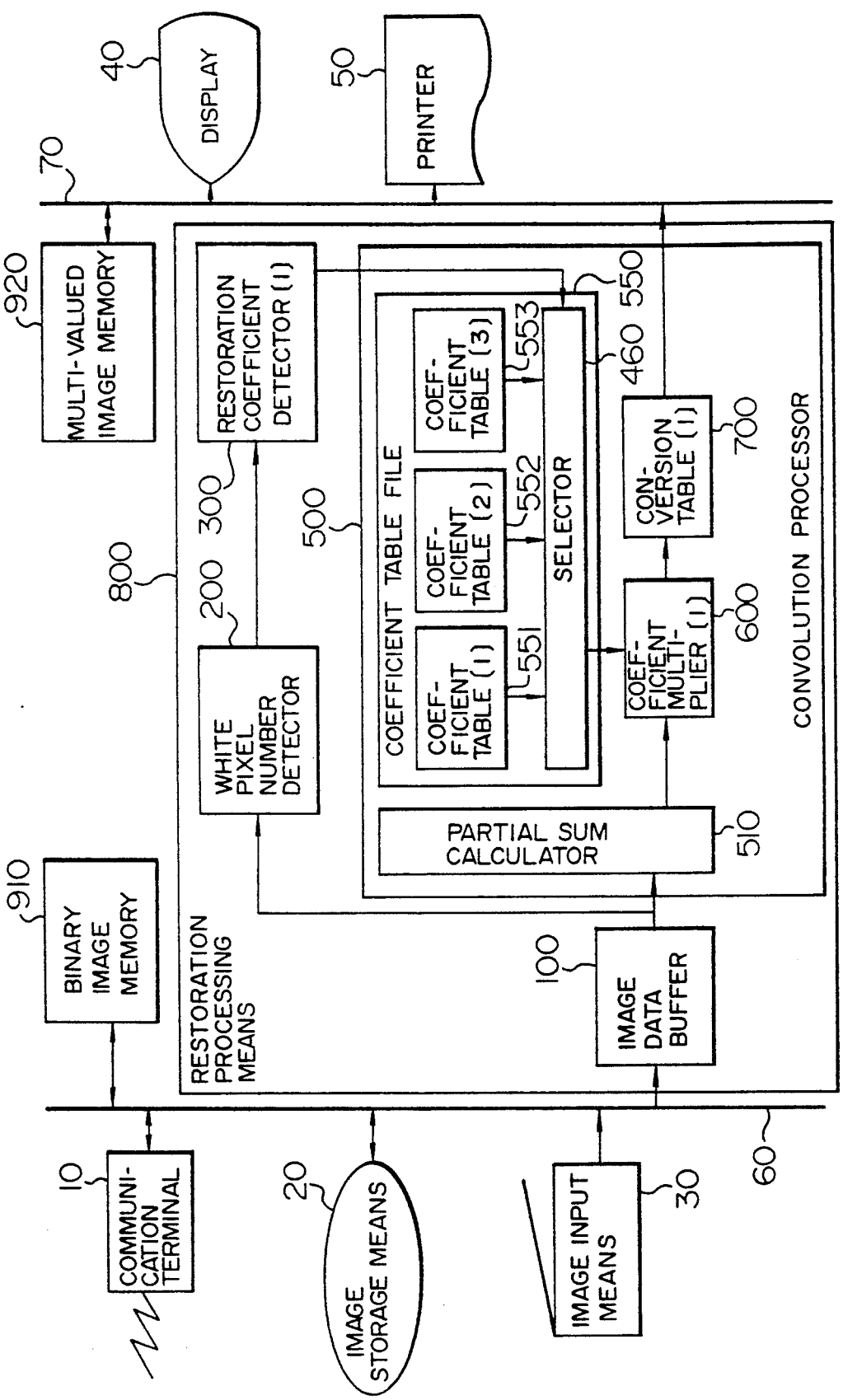
FIG. 11 is an arrangement of a second embodiment of the present invention wherein coefficient switching is realized by storing only a plurality of coefficient matrixes.

FIG. 11 shows a functional block diagram of an arrangement of a second embodiment of the present invention, wherein a plurality of coefficient matrixes are stored. The second embodiment of FIG. 11 is different from the embodiment of FIG. 1 in that only the coefficient multiplier 600 and conversion table 700 are provided without the coefficient multipliers 630 and 670 and the conversion tables 730 and 770. Though only the coefficient multiplier 600 is provided, various operations, with use of various sorts of coefficient matrixes, can be realized by means of a coefficient table file 550. In the drawing, the coefficient table file 550 has three sorts of coefficient tables 551, 552 and 553. FIG. 12 shows the contents of the respective coefficient tables when it is desired to realize the same multiplication/accumulation operation as in FIG. 1. Only one of the stored coefficient tables is selected at a selector 460 based on an output of the restoration coefficient selector 300 and then transferred to the coefficient multiplier 600.

Althouqh the explanation of the coefficient table file 550 has been made with the respective functional blocks divided in FIG. 11, the coefficient table file 550 can include a single ROM in actual applications.

Figure 13:
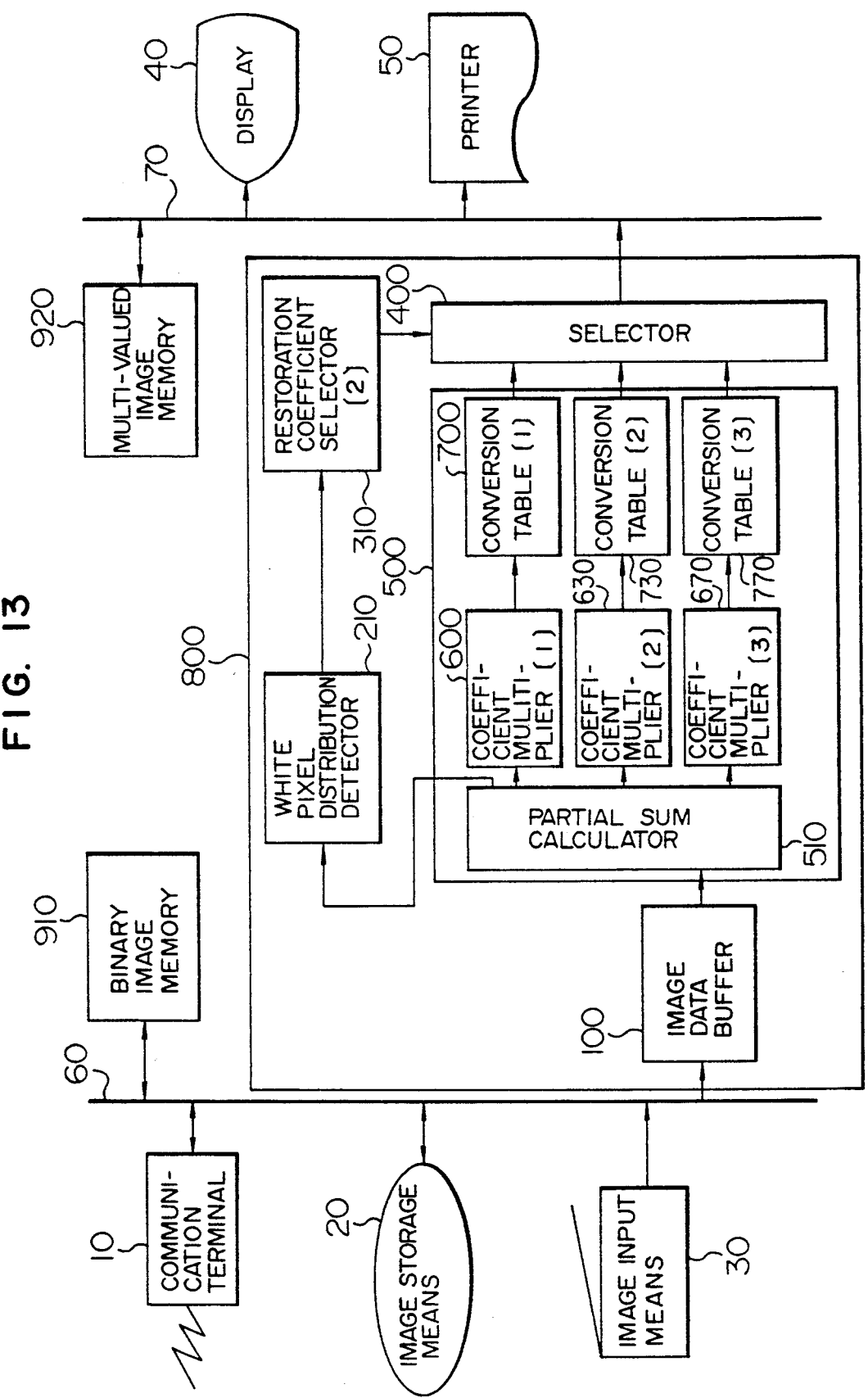
FIG. 13 is an arrangement of a third embodiment of the present invention wherein a white pixel distribution is used as a feature for coefficient selection.

Referring next to FIG. 13, there is shown a third embodiment of the present invention in which not a simple white pixel number in a region but rather its distribution pattern is used as a feature when the coefficient matrix is switched. When a dither image is scanned with a constant window size and a white pixel number is detected, there occurs such a case where partially the same white pixel number is detected based on the pitch of white pixels and the width of the window even with respect to an image different in white pixel density.

Shown in FIG. 14 is an example when a dither image is one-dimensionally displayed for its simplicity. In the drawing, each division of the horizontal axis denotes one pixel, and white pixel generation densities in FIGS. 14A and 14B are 25% and 50%, respectively. Meanwhile, when two images are observed with a scanning window of 5 pixels wide, a variation in the white pixel number in the window is as shown in FIGS. 14C and 14D. At a point 10 in FIG. 14C or at a point 12 in FIG. 14D, two white pixels exist in 5 pixels in the vicinity of the point. In order to distinguish them, the distribution pattern of white pixels in the window is utilized. In the case of FIG. 14A, for example, since the image has one or two white pixels, its interval is relatively large. Accordingly, even when the two white pixels are present within the window, the pixels are located apart from each other at both sides of the window. In the case of FIG. 14B, since the image has two or three white pixels, its interval is relatively small. Thus, when two white pixels are present within the window, they are located close to each other in the vicinity of the center of the window.

Figure 14A:
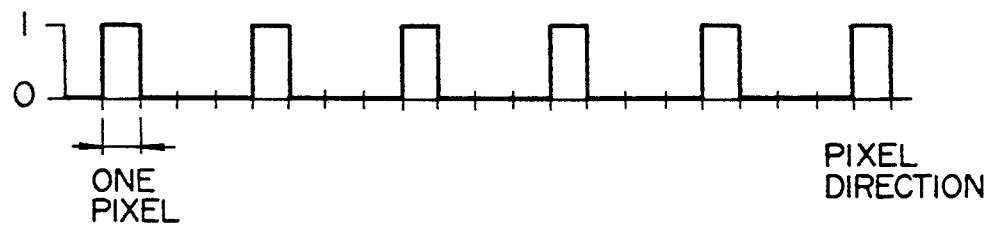
FIGS. 14A-14D show diagrams for explaining the object of using the white pixel distribution as the feature.
Figure 14B:
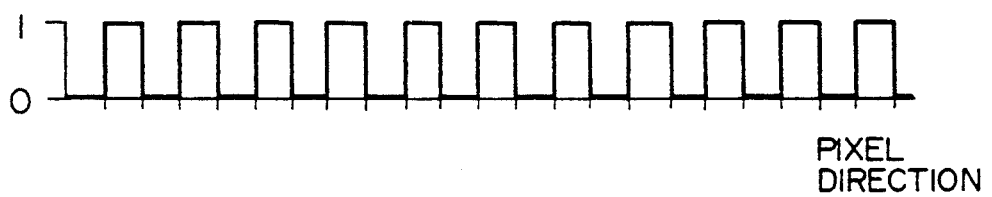
Figure 14C:
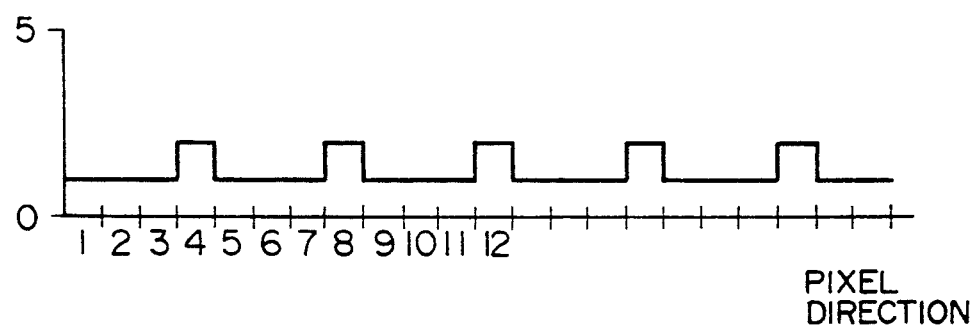
Figure 14D:
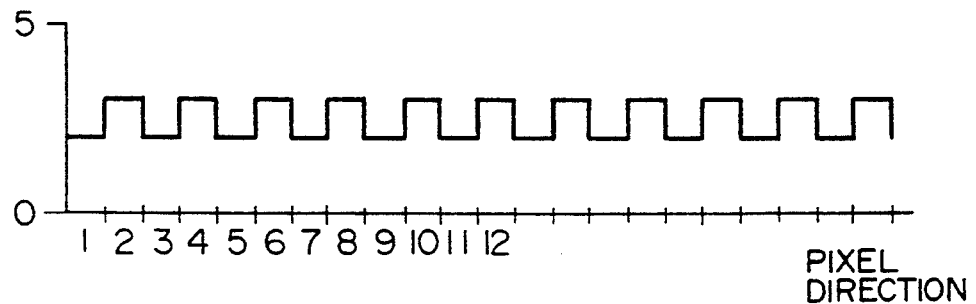

In this way, a white pixel distribution detector 210 detects, in addition to the white pixel number, the number of white pixels in the center part to a distinction between FIG. 14A and FIG. 14B. To this end, in the arrangement of FIG. 13, the white pixel number detector 200 in FIG. 1 is replaced by the white pixel distribution detector 210. Further, the restoration coefficient selector [1] 300 in FIG. 1 is replaced by a restoration coefficient selector [2] 310 in FIG. 13. The restoration coefficient selector [2] 310 generates the same output as the restoration coefficient selector [1] 300 but has a function of independently inputting a white pixel number in the center vicinity, in addition to the output of the white pixel distribution detector 210, as the judgement features.

Figure 15:
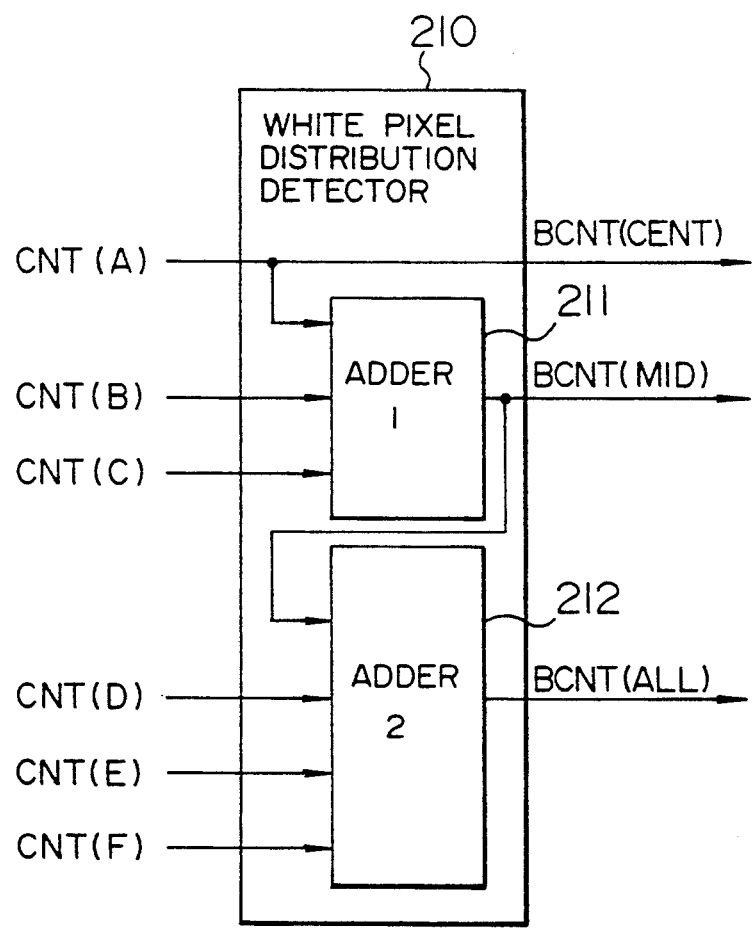
FIG. 15 shows an arrangement of a white pixel distribution detector.

Shown in FIG. 15 is an exemplary structure of the white pixel distribution detector 210. In this case, the white pixel distribution detector 210 outputs the numbers of white pixels belonging to one center pixel, 9 middle pixels arranged 3×3 in a matrix and all 25 pixels of another matrix, as data BCNT(CENT), BCNT(MID) and BCNT(ALL) independently of each other. The aforementioned white pixel number detector 200 can be considered to be equivalent to the white pixel distribution detector 210 which outputs only the data BCNT(ALL). Meanwhile, the restoration coefficient selector [2] 310 determines one of the restoration coefficient matrixes according to the three sorts of features as the outputs of the white pixel distribution detector 210.

The judgement criterion can be arbitrarily determined. An example of the operation of the restoration coefficient selector [2] 310 is shown in FIG. 16. This judgement criterion is substantially the same as in the aforementioned restoration coefficient selector [1] 300, in which judgement is made based on the white pixel number and when judgement is difficult, that is, in the vicinity of a point at which an output value FLG changes, reference is made to the data BCNT(CENT) and BCNT(MID).

With such an arrangement as mentioned above, finer judgement can be realized. Further, a coefficient switching system may be realized by the similar technique using various sorts of features. In the third embodiment, it is also possible to perform such operations using the coefficient table file and various sorts of coefficient matrixes as already explained in the second embodiment. In this case, selection is made on the basis of the output of the restoration coefficient selector [2] 310.

Figure 17:
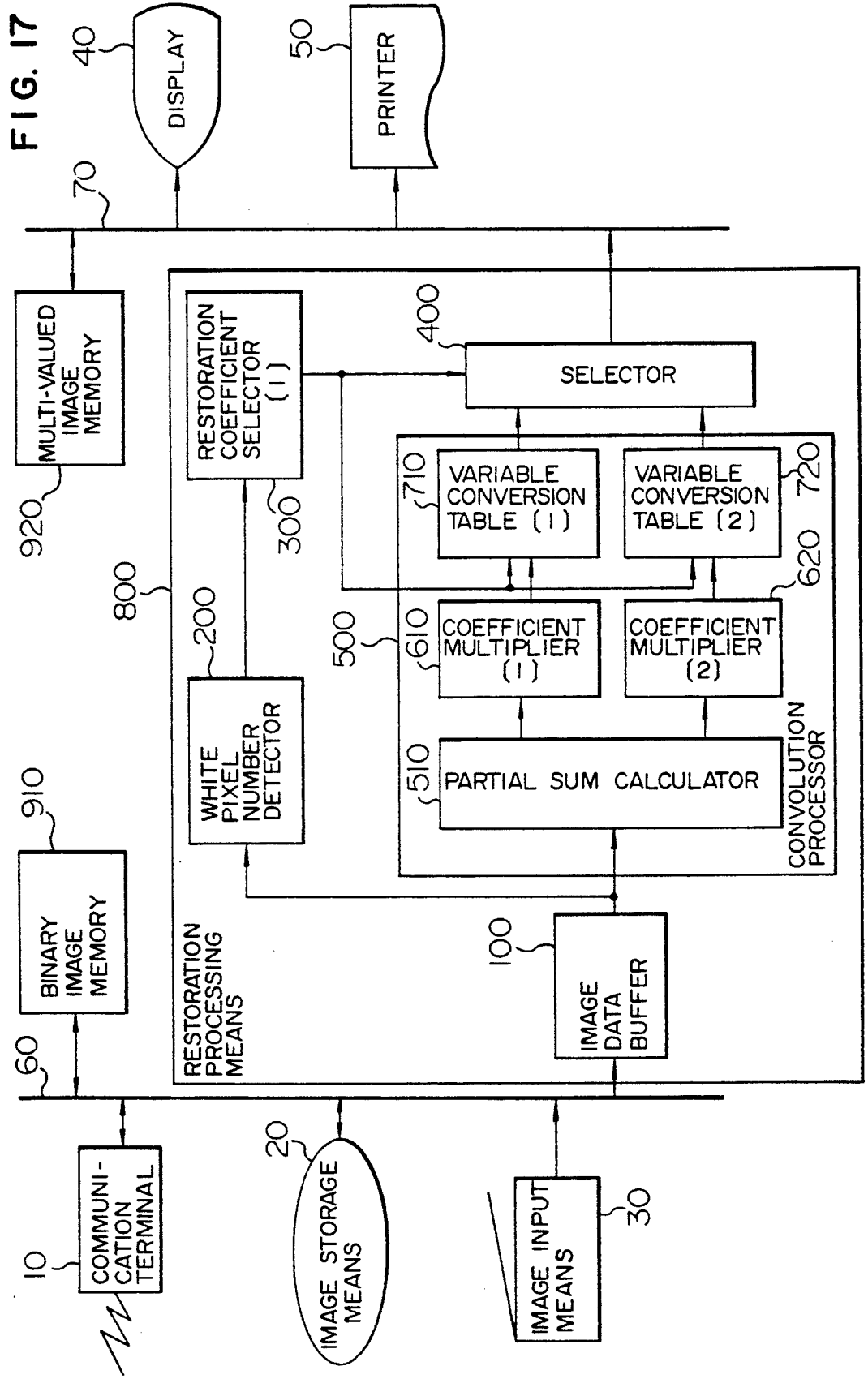
FIG. 17 is an arrangement of a fourth embodiment of the present invention wherein a conversion table is converted according to an image.

FIG. 17 shows a functional block diagram of a structure of fourth embodiment of the present invention. In the present embodiment, a conversion table function as means for switching the value of a restoration image can be switched with use of features including the white pixel number. Two sorts of coefficients are used in the restoration of a dither image in the present embodiment for the simplicity of explanation although, more than two sorts of coefficients may be employed as in the first embodiment of FIG. 1. Although explanation is made in the connection with the cas where the white pixel number is used as a coefficient switching feature as in the first embodiment of FIG. 1, it goes without saying that the fourth embodiment may be applied also to the second and third embodiments of FIGS. 11 and 13.

An output of the restoration coefficient selector [1] 300 is applied not only to the selector 400 but also to variable conversion tables 710 and 720. The variable conversion table [1] 710, like the aforementioned conversion table [1] 700 in FIGS. 1 and 13, may be realized in the form of a read only memory (ROM). In this case, the variable conversion table [1] 710 is increased in the capacity to receive the output of the restoration coefficient selector [1] 300 as its upper address.

Figure 18:
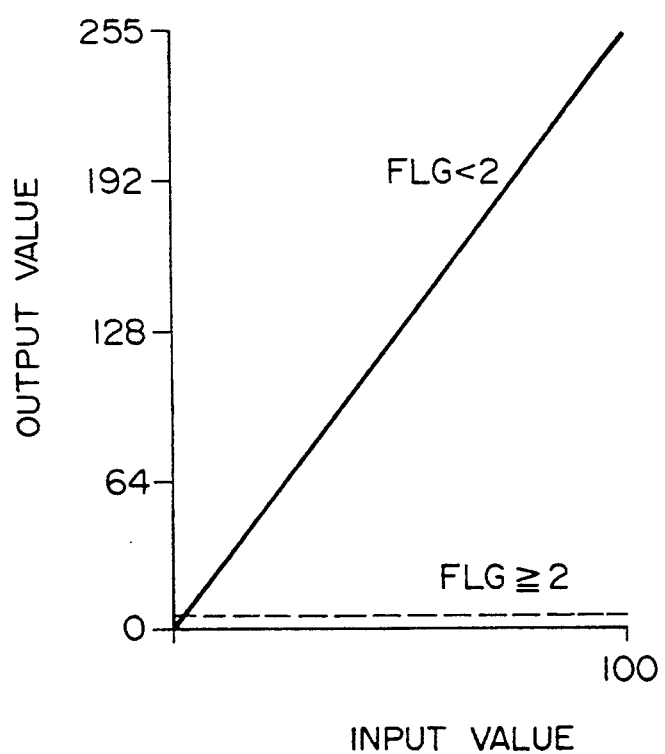
FIG. 18 is a diagram for explaining the contents of a variable conversion table.

Referring to FIG. 18, there is shown a diagram for explaining an example of the variable conversion table wherein an acceptable input value range is from 0 to 100 and an acceptable output value range is from 0 to 255. That is, FIG. 18 shows the case where such a table is used that, when the output FLG of the restoration coefficient selector 300 is less than 2, the output varies linearly with the input value, while, when the FLG is equal to or more than 2, the output value is constant, whereby the drop-like noise of the restoration image is suppressed.

Explanation has been made in the connection with the case where the plurality of coefficient multipliers are provided in the present embodiment. In the case where the variable conversion table is employed, however, the single coefficient multiplier may be used and output switching may be realized only by switching the conversion table according to the output of the restoration coefficient selector [1] 300. In this case, the selector 400 may also be removed.

Figure 19:
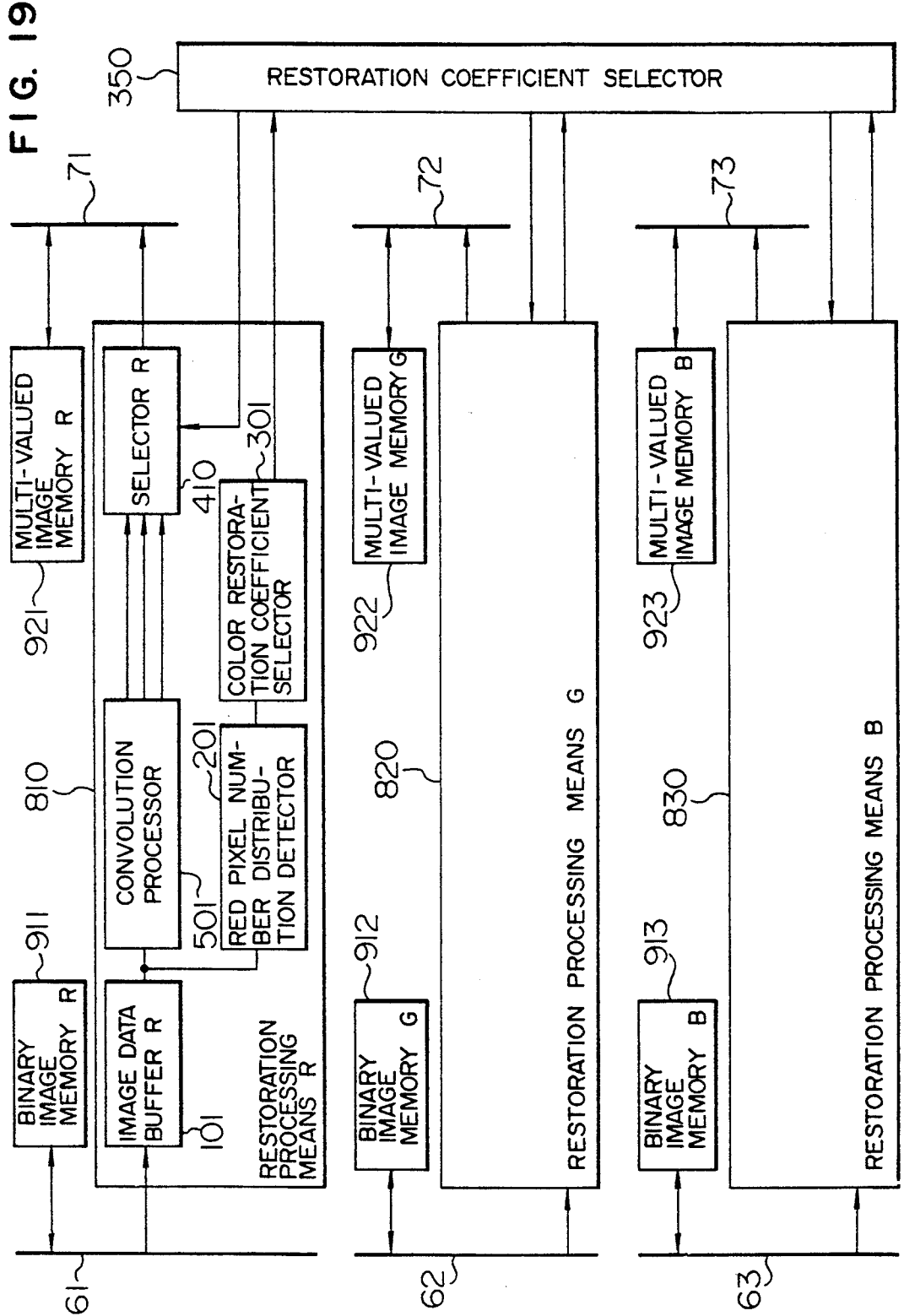
FIG. 19 is an arrangement of a fifth embodiment of the present invention wherein a color image is handled.

Next, explanation will be directed to the case where a color image is handled. Generally speaking, a color dither image is expressed by overlapping a plurality of dither images of red, blue and green or yellow, magenta and cyan. A fifth embodiment of the present invention will be explained in connection with the case where a color is expressed with use of three dither images of red, blue and green. Shown in FIG. 19 is an exemplary structure of the restoration processing mean in the fifth embodiment when a color image is handled. In the drawing, restoration processing means 810, 820 and 830 have respectively substantially the same arrangement as the restoration processing means 800 in FIG. 1. The difference between the restoration processing means 810, 820 or 830 and the restoration processing means 800 is that the selector 400 is driven directly by the output of the restoration coefficient selector [1] 300 in the restoration processing means 800 in FIG. 1, while a restoration coefficient selector 350 is provided independently of the three restoration processing means 810, 820 and 830 to select the final coefficient according to the output signals of restoration coefficient selectors 301, 302 and 303 corresponding to the different colors in FIG. 19.

An output FLGX of the restoration coefficient selector 350 may have the same value for the different colors or may have different values of FLGXr, FLGXg and FLGXb corresponding to the different colors. Shown in FIG. 20 is an exemplary operation of the restoration coefficient selector 350. In this case, reference symbols FLGr, FLGg and FLGb denote the outputs of the three restoration coefficient selectors 301, 302 and 303 corresponding to the colors R, G and B respectively.

Although a white pixel number within the scanning window, i.e., the number of pixels having "ON" colors, is used as a feature for coefficient selection for simplicity of explanation in the present embodiment, another feature, for example, a white pixel distribution state such as mentioned above, may be used to realize substantially the same effects with substantially the same arrangement. Further, signal lines are connected to the restoration processing means independently with respect to the colors R, G and B in the present embodiment, but a common signal line may be connected to the restoration processing means in a time series manner.

Among images, in particular, a document image often contains an image part having varying brightness density such as a photograph and such as a line image part drawn by lines such as a letter or a figure.

Such an image is generally subjected to a dither processing with respect to its varying brightness density part while subjected to a binary processing based on a fixed threshold value or a floating threshold value with respect to its line image part. When it is desired to restore such a mixed image, for the purpose of preventing the blurring of the line image part, it is necessary to make the line image part an image part having no intermediate density, i.e., comprising only whites and blacks.

The image processing systems so far explained in the present specification are intended to restore a dither image, but with respect to the mixed image it is indispensable to restore the line image part.

Figure 21:
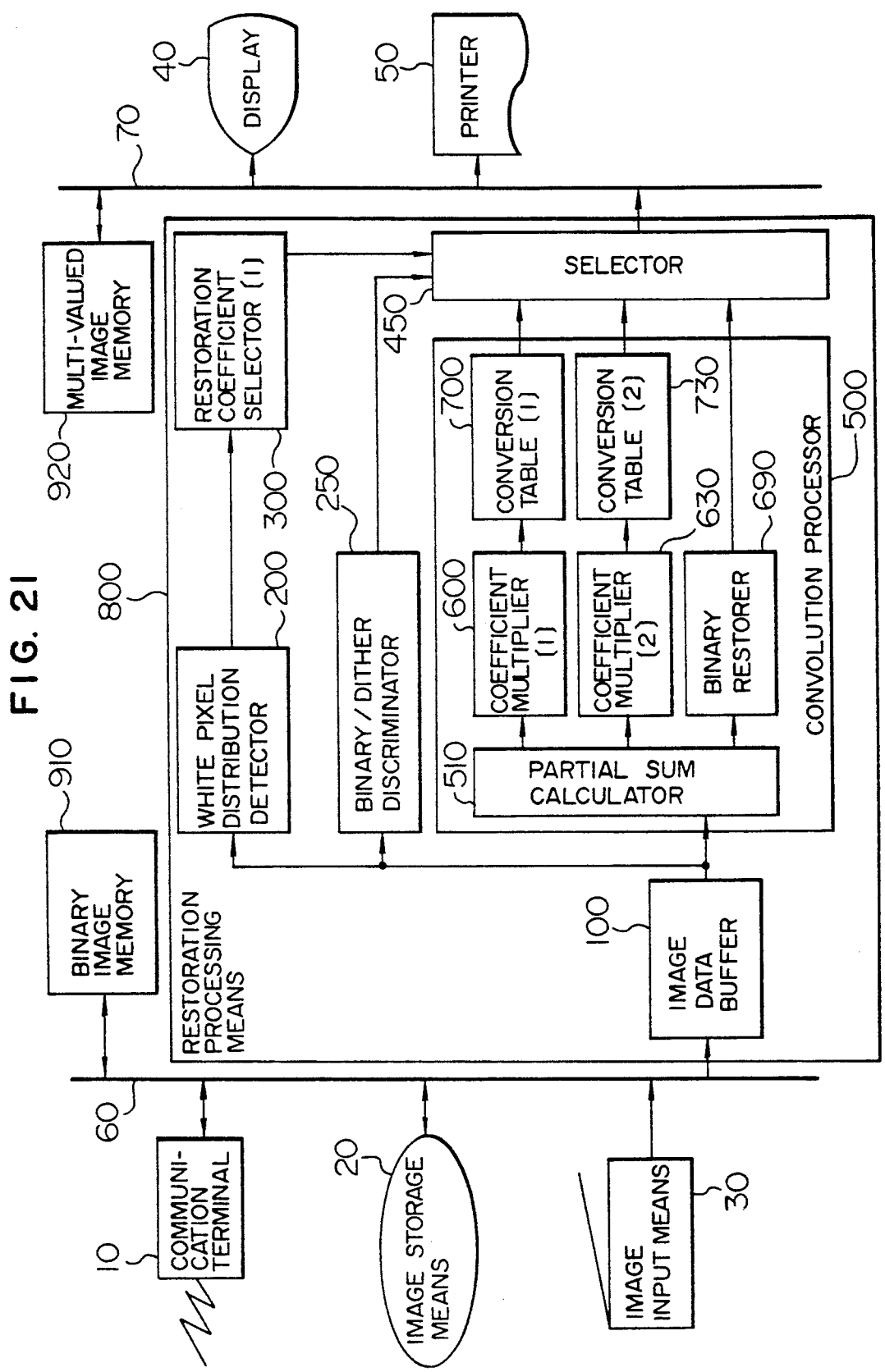
FIG. 21 is an arrangement of a sixth embodiment of the present invention wherein an image having a letter and a photograph mixed together is handled.

FIG. 21 shows an exemplary arrangement of a sixth embodiment of the present invention which handles such a mixed image having lines and figures. In the drawing, a binary/dither discriminator 250 determines, on the basis of a sequentially received binary image data, whether the pixel belongs to a binary region or to a dither image region, and an identification code. A binary restorer 690 receives a binary data and outputs the maximum or minimum of a multi-valued data. More specifically, when an output data is, for example, of 8 bits, the binary restorer 690 outputs "0" for the input value "0" and "255" for the input value "1". In this case, the binary restorer 690 may be realized by means of such a convenient means for outputting the input signal through 8 output signal lines.

In FIG. 21, a selector 450 selects and outputs one of three sorts of input values on the basis of the output of the restoration coefficient selector [1] 300 and the output of the binary/dither discriminator 250. The selector 450 is featured in that, when the binary/dither discriminator 250 determines to be the binary image, the selector 450 selects the output of the binary restorer 690 regardless of the output of the restoration coefficient selector [1] 300.

Though the two sorts of coefficients have been employed in the restoration of the dither image for simplicity of explanation even in the present embodiment, more than two sorts of coefficients may be employed as in the case of FIG. 1.

Figure 22:
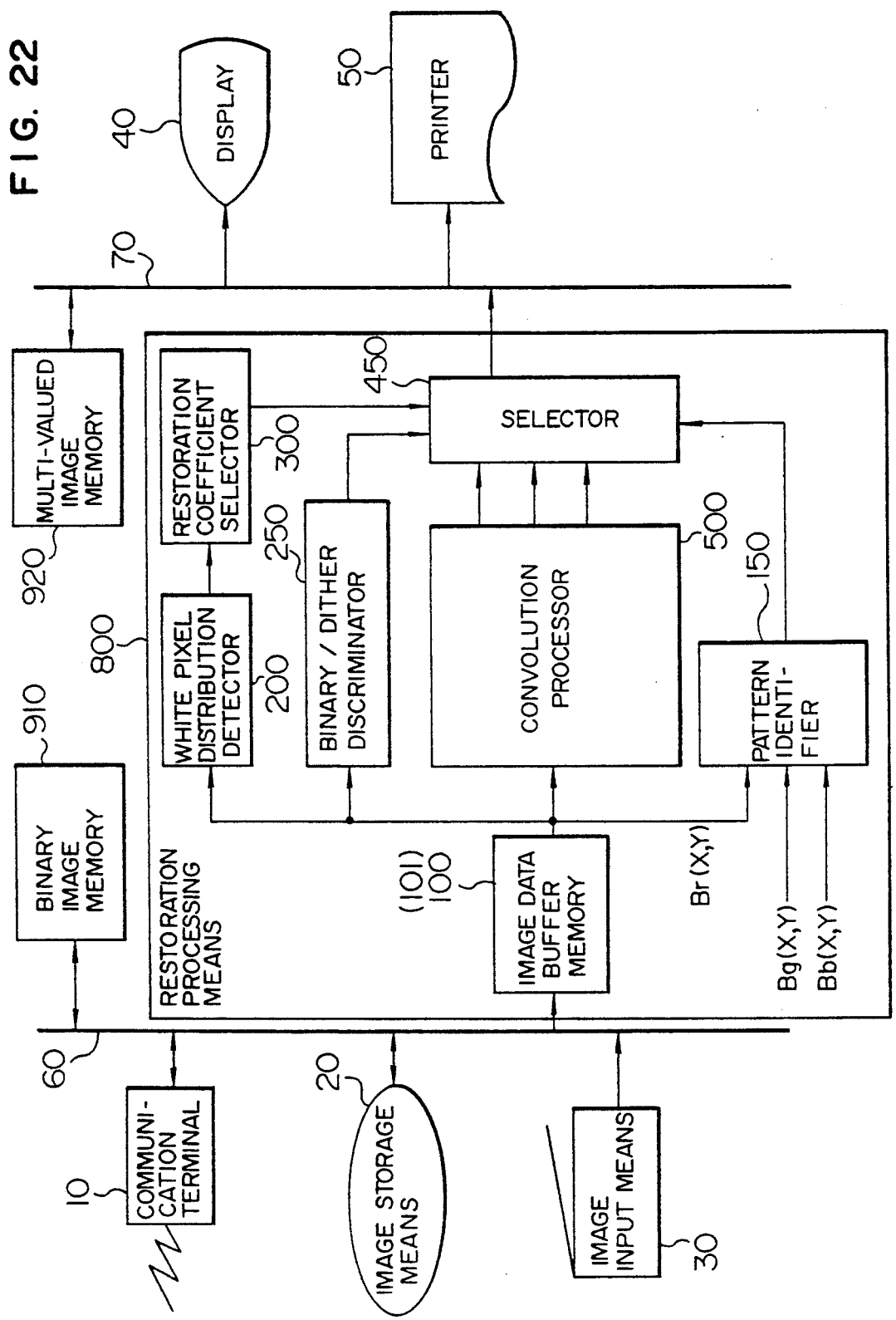
FIG. 22 is an arrangement of a seventh embodiment of the present invention wherein an image having color/monochrome and letter/photograph mixed together is handled.

Referring to FIG. 22, there is shown an exemplary arrangement of a seventh embodiment of the present invention which handles such a color image having a mixture of a line, a figure and/or a color photograph as mentioned above, in which, in the restoration processing means 800, only an image restorer corresponding to the R image is illustrated and restorers corresponding to the G and B images are omitted. The present embodiment is featured in that the same restoration coefficient selector 300 as the restoration coefficient selector 310 explained in FIG. 13 as well as the same binary/dither discriminator 250 as the binary/dither discriminator 250 explained in FIG. 21 are provided, and that a pattern identifier 150 is newly provided.

The pattern identifier 150 has the functions of receiving binary data, each corresponding to 25 pixels from the image data buffers 100 (more precisely, 101, 102 and 103) corresponding to the colors R, G and B respectively, and of finding a correlation between the three data. The pattern identifier 150 determines whether or not the three data R, G and B coincide with each other completely. This determining means is known. The selector 450 selects output data on the basis of the outputs of the restoration coefficient selector 300, binary/dither discriminator 250 and pattern identifier 150.

An exemplary operation of the selector 450 is shown in FIG. 23. In this case, the color image having a photograph and a letter mixed together is subjected to a convolution processing with respect to its color part to express its color, even when the letter is a line image part.

In the case of a monochrome image, adjacent pixels are the same with respect to the colors R, G and B. Accordingly, it can be determined on the basis of the output FLGP of the pattern identifier 150 whether or not the corresponding pixel is in the color part or in the monochrome part. For this reason, only when the output of the pattern identifier 150 corresponds to the monochrome part, the selector 450 references the output of the binary/dither discriminator 250.

When the output FLGP of the pattern identifier 150 represents the monochrome output and the output FLGD of the binary/dither discriminator 250 represents the binary output, the selector 450 selects the output of the binary restorer 690 (refer to FIG. 21). In the other cases, the selector 450 selects either one of the outputs of the conversion tables 700 and 730 (refer to FIG. 21) through the two coefficient multipliers 600 and 630 on the basis of the output of the restoration coefficient selector 300.

Through the aforementioned processing procedure of the arrangement, a multi-valued image data can be restored from the mixed data having various sorts of dither and/or line images mixed together.

In this way, when such restoration processing means, as explained above, are incorporated in the system, the system enables a binary image data to be displayed on a multi-valued output device.

Thus, a document image, for example, having a color picture can be stored in the form of a binary data, the binary data can be subjected to the processing of the aforementioned restoration processing means, and then can be output.

FIG. 24 shows diagrams for explaining a procedure of storing and outputting an image. More specifically, FIG. 24A shows a system for reading a document as an image data. The image input means 30, which is a known means, reads a document as a multi-valued image data, subjects the read-in data to a binary processing including a dither processing and then output a binary image data. In this connection, such means is known that subjects only a half-tone region such as a photograph in a document to the dither processing and subjects the other regions to the binary processing. The binary image data is temporarily stored in an internal binary image memory 910 and then recorded in such an image storage means 20 as, for example, an optical disk.

Meanwhile, FIG. 24B shows an exemplary arrangement of a system for displaying and/or outputting the stored image. In the drawing, the image storage means 20 corresponds to such an optical disk in which the image data entered through the aforementioned input device are recorded. In this case, the image storage means 20 is of a portable type as an example. Similarly, the image storage means 20 may be replaced by a communication terminal and a binary image data may be transferred.

A binary image data read out from the image storage means 20 is temporarily stored in a binary image memory 911, converted into a multi-valued data at the aforementioned restoration processing means 800, and then stored in a multi-valued image memory 920. The arrangement and processing contents of the restoration processing means 800 during the above operation are as already explained above. The multi-valued image data is sent through the output bus 70 of the signal lines to various sorts of output devices to be displayed or printed.

Through the use of the aforementioned image data processing method, a half-tone image including a color can be stored in the form of a binary data. Further, since the image can be also transferred in the form of a binary data, the image transferred through a known facsimile line can also be converted into a multi-valued data, displayed and output.

In accordance with the present invention, data, which is once converted into a binary data and recorded as a dither image, may be output as a multi-valued image. Further, there can be realized such an image processing system that provides high quality of output image regardless of the dither system used in the binary processing operation.

In addition, the use of the present invention enables an image having a varying brightness density and including a color to be stored or transferred as a binary data.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An image processing system including input means for inputting a binary image data, restoration processing means for converting the binary image data into a multivalued image data, and output means for outputting the multi-valued image data, said restoration processing means comprising:

means for storing the binary image data;

means for scanning the stored binary image data within a window of a predetermined size of m×n pixels (m, n being positive integers);

white pixel number detection means for detecting the number of white pixels in the binary image data within said window;

a plurality of calculation means for performing multiplication/accumulation operation over the binary image data within said window and a predetermined coefficient matrix to provide a plurality of multi-valued image data; and selection means for selecting one of said plurality of multi-valued image data found by said plurality of calculation means.

2. An image processing system as set forth in claim 1, wherein said plurality of calculation means include numeral conversion means for receiving said plurality of multi-valued image data and converting them into a plurality of multi-valued data.

3. An image processing system as set forth in claim 2, wherein said selection means selects one of the plurality of multi-valued image data found by said numeral conversion means according to the white pixel number detected by said white pixel number detection means.

4. An image processing system as set forth in claim 1, wherein said system further comprises means for inputting color image data comprising a plurality of planes of binary image data and said plurality of planes of input binary image data being processed by a plurality of restoration processing means.

5. An image processing system as set forth in claim 4, wherein said plurality of restoration processing means include, respectively, means for detecting a feature of an associated one of said plurality of color images and outputting a coefficient selection code according to the associated feature and means for selecting an associated one of the plurality of multi-valued color image data according to a coefficient selection final code, said system further comprising means for inputting said coefficient selection codes for the respective colors and outputting said coefficient selection final code.

6. An image processing system a set forth in claim 5, wherein said plurality of restoration processing means use the number of white pixels within the scanning window and the number of white pixels in a predetermined part of the scanning window as said coefficient selection features.

7. An image processing system as set forth in claim 1, wherein said restoration processing means includes means for identifying whether or not the multi-valued image data output from said restoration processing means is a dither image, the identification result being used in at least one of the selection elements of said selection means.

8. An image processing system as set forth in claim 7, wherein said system includes means for inputting a color image data comprising at least three R, G and B planes of binary image data, said R, G and B input binary image data being processed independently by at least three of said restoration processing means, each of said restoration processing means includes means for inputting the R, G and B color binary image data and providing a correlation between the three data, and an output of said means being used in at least one of the selection elements of said selection means.

9. An image processing system including input means for inputting a binary image data, restoration processing means for converting the binary image data into a multi-valued image data, and output means for outputting the multi-valued image data, said restoration processing means comprising:

means for storing the binary image data;

means for scanning the stored binary image data within a window of a predetermined size of m×n pixels (m, n being positive integers;

white pixel number detection means for detecting the number of white pixels in the binary image data within said window;

storage means for storing therein a plurality of coefficient matrixes;

selection means for selecting one of said plurality of stored coefficient matrixes to be used in a multiplication/accumulation operation according to said detected white pixel number; and calculation means for performing multiplication/accumulation operation over the binary image data within said window and said selected coefficient matrix to provide a multi-valued image data.

10. An image processing system as set forth in claim 9, wherein said calculation means includes means for inputting said multi-valued image data and converting it into a multi-valued numeral data.

11. An image processing system as set forth in claim 9, wherein said system has means for inputting color image data comprising a plurality of planes of binary image data, said plurality of planes of input binary image data being processed by a plurality of restoration processing means.

12. An image processing system as set forth in claim 11, wherein said plurality of restoration processing means include, respectively, means for detecting a feature of an associated one of said plurality of color images and outputting a coefficient selection code according to the associated feature and means for selecting an associated one of the plurality of multi-valued color image data according to a coefficient selection final code, said system further comprising means for inputting said coefficient selection codes for the respective colors and outputting said coefficient selection final code.

13. An image processing system as set forth in claim 12, wherein said plurality of restoration processing means use the number of white pixels within the scanning window and the number of white pixels in a predetermined part of the scanning window as said coefficient selection features.

14. An image processing system as set forth in claim 9, wherein said restoration processing means includes means for identifying whether or not the multi-valued image data output from said restoration processing means is a dither image and its identification result is used in at least one of the selection elements of said selection means.

15. An image processing system as set forth in claim 14, wherein said system includes means for inputting a color image data comprising at least three red (R), green (G) and blue (B) planes of binary image data, said R, G and B input binary image data are processed independently by at least three said restoration processing means, each of said restoration processing means includes means for inputting the R, G and B color binary image data and providing a correlation between the three data, and an output of said means is used in at least one of the selection elements of said selection means.

16. An image processing system including input means for inputting a binary image data, restoration processing means for converting the binary image data into a multi-valued image data, and output means for outputting the multi-valued image data,
said restoration processing means comprising:
means for storing the binary image data;
means for scanning the stored binary image data within a window of a predetermined size of m×n pixels (m, n being positive integers);
detection means for detecting a distribution pattern of white pixels of the binary image data within said window;
a plurality of calculation means for performing a multiplication/accumulation operation over the binary image data within said window and predetermined coefficient matrixes to provide a plurality of multi-valued image data; and
selection means for selecting one of said plurality of multi-valued image data found by said plurality of calculation means according to said detected white pixel distribution pattern.

17. An image processing system as set forth in claim 16, wherein said white pixel distribution pattern detection means use the number of white pixels within the scanning window and the number of white pixels in a predetermined part of the scanning window as said white pixel distribution pattern.

18. An image processing system as set forth in claim 16, wherein said plurality of calculation means include means for inputting said multi-valued image data and converting them into multi-valued numeral data.

19. An image processing system as set forth in claim 18, wherein said selection means selects one of said plurality of multi-valued image data found by said numeral conversion means according to said white pixel distribution pattern detected by said white pixel distribution pattern detection means.

20. An image processing system as set forth in claim 16, wherein said system has means for inputting a color image data comprising a plurality of planes of binary image data and said plurality of planes of input binary image data are processed by a plurality of restoration processing means.

21. An image processing system as set forth in claim 20, wherein said plurality of restoration processing means include, respectively, means for detecting a feature of an associated one of said plurality of color images and outputting a coefficient selection code according to the associated feature and means for selecting an associated one of said plurality of color images and outputting a coefficient selection code according to the associated feature and means for selecting an associated one of the plurality of multi-valued color image data according to a coefficient selection final code, said system further comprising means for inputting said coefficient selection codes for the respective colors and outputting said coefficient selection final code.

22. An image processing system as set forth in claim 21, wherein said plurality of restoration processing means use the number of white pixels within the scanning window and the number of white pixels in a predetermined part of the scanning window as said coefficient selection features.

23. An image processing system as set forth in claim 16, wherein said restoration processing means includes means for identifying whether or not the multi-valued image data outputted from said restoration processing means is a dither image and its identification result is used in at least one of the selection elements of said selection means.

24. An image processing system as set forth in claim 23, wherein said system includes mean for inputting a color image data comprising at least three R, G and B planes of binary image data, said R, G and B input binary image data are processed independently by at least three of said restoration processing means, each of said restoration processing means includes means for inputting the R, G and B color binary image data and providing a correlation between the three data, and an output of said means is used in at least one of the selection elements of said selection means.

25. An image processing system including input means for inputting a binary image data, restoration processing means for converting the binary image data into a multi-valued image data, and output means for outputting the multi-valued image data,
said restoration processing means comprising:
means for storing the binary image data;
means for scanning the stored binary image data within a window of a predetermined size of m×n pixels (m, n being positive integers);
detection means for detecting a distribution pattern of white pixels of the binary image data within said window;
means for storing therein a plurality of coefficient matrixes;
selection means for one of said plurality of stored coefficient matrixes to be used in a multiplication-/accumulation operation according to said detected white pixel distribution pattern; and
calculation means for performing the multiplication-/accumulation operation over the binary image data within said window and said selected matrix to provide a multi-valued image data.

26. An image processing system including input means for inputting a binary image data, restoration processing means for converting the binary image data into a multi-valued image data, and output means for outputting the multi-valued image data,
said restoration processing means comprising:
means for storing the binary image data;
means for scanning the stored binary image data within a window of a predetermined size of m×n pixels (m, n being positive integers);
white pixel detection means for detecting white pixels in the binary image data within said window;
a plurality of calculation means for performing a multiplication/accumulation operation over the binary image data within said window and predetermined coefficient matrixes to provide a plurality of multi-valued image data;
a plurality of numeral conversion means for receiving said plurality of multi-valued image data and performing a numeral conversion thereover;
means for switching a numeral conversion method of said numeral conversion means according to the number of said detected white pixels; and
selection means for selecting one of said plurality of multi-valued image data found by said plurality of numeral conversion means according to said detected white pixel number.

27. An image processing system as set forth in claim 26, wherein said system includes means for inputting a color image data comprising a plurality of planes of binary image data and said plurality of planes of input binary image data are processed by a plurality of restoration processing means.

28. An image processing system as set forth in claim 27, wherein said plurality of restoration processing means include, respectively, means for detecting a feature of an associated one of said plurality of color images and outputting a coefficient selection code according to the associated feature and means for selecting an associated one of the plurality of multi-valued color image data according to a coefficient selection final code, said system further comprising means for inputting said coefficient selection codes for the respective colors and outputting said coefficient selection final code.

29. An image processing system as set forth in claim 28, wherein said plurality of restoration processing means use the number of white pixels within the scanning window and the number of white pixels in a predetermined part of the scanning window as said coefficient selection features.

30. An image processing system as set forth in claim 26, wherein said restoration processing means includes means for identifying whether or not the multi-valued image data output from said restoration processing means is a dither image and its identification result is used in at least one of the selection elements of said selection means.

31. An image processing system as set forth in claim 30, wherein said system includes means for inputting a color image data comprising at least three R, G and B planes of binary image data, said R, G and B input binary image data are processed independently by at least three of said restoration processing means, each of said restoration processing means includes means for inputting the R, G and B color binary image data and providing a correlation between the three data, and an output of said means is used in at least one of the selection elements of said selection means.

32. An image processing system including input means for inputting a binary image data, restoration processing means for converting the binary image data into a multi-valued image data, and output means for outputting the multi-valued image data,
said restoration processing means comprising:
means for storing therein the binary image data;
means for scanning the stored binary image data within a window of a predetermined size of m×n pixels (m, n being positive integers);
detection means for detecting a distribution pattern of white pixels of the binary image data within said window;
a plurality calculation means for performing a multiplication/accumulation operation over the binary image data within said window and predetermined coefficient matrixes to provide a plurality of multi-valued image data;
a plurality of numeral conversion means for receiving said plurality of multi-valued image data and performing numeral conversion thereover;
means for switching a numeral conversion methods of said plurality of numeral conversion means according to said detected white pixel distribution pattern; and selection means for selecting one of said plurality of stored multi-valued image data found by said numeral conversion means according to said detected white pixel distribution pattern.

33. An image processing method comprising the steps of:
inputting multi-valued image data and subjecting said input multi-valued image data to a binary processing including a dither operation to store said binary data;
storing said binary image data;
scanning the stored binary image data within a window of a predetermined size of m×n pixels (m, n being positive integers);
detecting a distribution pattern of white pixels of the binary image data within said window;
performing a multiplication/accumulation operation over the binary image data within said window and predetermined coefficient matrixes to provide a plurality of multi-valued image data; and
selecting one of said plurality of multi-valued image data according to said detected white pixel distribution pattern.

34. An image processing method as set forth in claim 33, wherein said input multi-valued image data is a color image.

35. An image processing method as set forth in claim 33, wherein said input multi-valued image data is a mixed image having a letter and a photograph mixed together.

36. An image processing method comprising the steps of:
inputting a multi-valued image data and subjecting said input multi-valued image data to a binary processing including a dither operation to store said binary data;
storing said binary image data;
scanning the stored binary image data within a window of a predetermined size of m×n pixels (m, n being positive integers);
detecting the number of white pixels in the binary image data within said window or a distribution pattern of white pixels thereof;
selecting one of said plurality of stored coefficient matrixes to be used in a multiplication/accumulation operation according to said detected white pixel number of white pixel distribution pattern; and
performing the multiplication/accumulation operation over the binary image data within said window and said selected coefficient matrix to provide a multi-value image data.

37. An image processing method as set forth in claim 36, wherein aid input multi-valued image data is a color image.

38. An image processing method as set forth in claim 36, wherein said input multi-valued image data is a mixed image having a letter and a photograph mixed together.

39. An image processing method comprising the steps of:
inputting a multi-valued image data and subjecting said input multi-valued image data to a binary processing including a dither operation to store said binary data;
storing said binary image data;
scanning the stored binary image data within a window of a predetermined size of m×n pixels;

detecting the number of white pixels in the binary image data within said window or a white pixel distribution pattern thereof;

performing a multiplication/accumulation operation over the binary image data within said window and said selected matrixes to provide a plurality multi-valued image data;

inputting said plurality of multi-valued image data and subjecting the plurality of multi-valued image data to a numeral conversion thereover;

switching said numeral conversion method according to said detected white pixel number or white pixel distribution pattern; and selecting one of said plurality of stored multi-valued image data according to said detected white pixel number or white pixel distribution pattern.

40. An image processing method as set forth in claim 39, wherein said input multi-valued image data is a color image.

41. An image processing method as set forth in claim 39, wherein said input multi-valued image data is a mixed image having a letter and a photograph mixed together.

* * * * *